United States Patent
Kawamura

(10) Patent No.: US 7,650,110 B2
(45) Date of Patent: Jan. 19, 2010

(54) WIRELESS COMMUNICATION APPARATUS AND WIRELESS COMMUNICATION METHOD FOR STORING AND ACCESSING A PLURALITY OF IMAGES

(75) Inventor: Takuya Kawamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 318 days.

(21) Appl. No.: 10/807,321

(22) Filed: Mar. 24, 2004

(65) Prior Publication Data

US 2004/0242265 A1    Dec. 2, 2004

(30) Foreign Application Priority Data

Mar. 28, 2003    (JP)    ............... 2003-092507

(51) Int. Cl.
  *H04H 20/71*   (2008.01)
  *H04L 29/06*   (2006.01)
  *H04M 1/00*    (2006.01)
(52) U.S. Cl. ................. 455/3.05; 455/556.1; 455/414.3
(58) Field of Classification Search ............... 455/3.05, 455/414.3, 41.2, 556.1, 556.2
  See application file for complete search history.

(56) References Cited

U.S. PATENT DOCUMENTS

| | | | |
|---|---|---|---|
| 6,736,726 B1 * | 5/2004 | Miura | 463/41 |
| 6,907,225 B1 * | 6/2005 | Wilkinson | 455/41.2 |
| 7,035,667 B2 * | 4/2006 | Ido | 455/556.1 |
| 2002/0032005 A1 * | 3/2002 | Yoshida | 455/41 |
| 2002/0102938 A1 * | 8/2002 | Tsubaki et al. | 455/3.06 |
| 2002/0112026 A1 * | 8/2002 | Fridman et al. | 709/217 |
| 2002/0137529 A1 * | 9/2002 | Takahashi | 455/457 |
| 2004/0160623 A1 * | 8/2004 | Strittmatter et al. | 358/1.15 |
| 2004/0242250 A1 * | 12/2004 | Sasai et al. | 455/502 |
| 2005/0036509 A1 * | 2/2005 | Acharya et al. | 370/466 |
| 2005/0130702 A1 * | 6/2005 | Saburi et al. | 455/556.1 |
| 2006/0009259 A1 * | 1/2006 | Tanaka | 455/556.1 |
| 2006/0142059 A1 * | 6/2006 | Ishiguro et al. | 455/556.1 |

(Continued)

FOREIGN PATENT DOCUMENTS

EP   1 133 104 A2   9/2001

(Continued)

OTHER PUBLICATIONS

Stephane Bouet, "Basic Imaging Profile" version 0.95c, Bluetooth Specification, Nov. 22, 2001, pp. 1-99.

(Continued)

*Primary Examiner*—Nay A Maung
*Assistant Examiner*—Andrew Wendell
(74) *Attorney, Agent, or Firm*—Oblon, Spivak, McClelland, Maier & Neustadt, L.L.P.

(57) ABSTRACT

There is disclosed a wireless communication apparatus which provides a plurality of images stored in a storage to an initiating wireless communication apparatus through wireless communications. A reception unit receives an image acquisition request transmitted from the initiating wireless communication apparatus. The request conforms to a camera control protocol for exchanging information relating to images. A selection unit selects, in response to the image acquisition request, one of the plurality of images stored in the storage. A transmission unit then transmits a response to the initiating wireless communication apparatus in accordance with the camera control protocol. Information relating to the one of the plurality of images that is selected by the selection unit is contained in the response.

16 Claims, 12 Drawing Sheets

U.S. PATENT DOCUMENTS

2007/0046998 A1* 3/2007 Ohnishi ...................... 358/3.1

FOREIGN PATENT DOCUMENTS

| EP | 1 244 287 A2 | 9/2002 |
| EP | 1 286 529 A1 | 2/2003 |
| EP | 1 404 108 A1 | 3/2004 |
| WO | WO 99/48276 | 9/1999 |

OTHER PUBLICATIONS

Pat Megowan, et al., "IrDA Object Exchange Protocol IrOBEX", Version 1.2 draft 1, Mar. 18, 1999, pp. 1-84.

* cited by examiner

WIRELESS COMMUNICATION APPARATUS AND WIRELESS COMMUNICATION METHOD FOR STORING AND ACCESSING A PLURALITY OF IMAGES

CROSS-REFERENCE TO RELATED APPLICATIONS

This application is based upon and claims the benefit of priority from prior Japanese Patent Application No. 2003-092507, filed Mar. 28, 2003, the entire contents of which are incorporated herein by reference.

BACKGROUND OF THE INVENTION

1. Field of the Invention

The present invention relates to an apparatus, method, and computer program for providing a plurality of images stored in a storage to another wireless communication apparatus through wireless communications.

2. Description of the Related Art

Specifications for a wireless communication scheme called Bluetooth (trade mark) and standardized by the Bluetooth SIG (Special Interest Group) relate to wireless devices, communication protocols, and application models. The specifications for application models are called profiles. For example, profiles for file transfer, exchange of electronic business card information, and exchange of photographic electronic images are called a file transfer profile, an object push profile, and a basic imaging profile. Each of these profiles includes specifications for data exchange. These profiles are characterized by utilizing IrOBEX (or simply OBEX). The OBEX protocol is a communication protocol that specifies a method of exchanging electronic information as objects. The OBEX protocol has a connection setting function, a connection clearing function, an object transmission function, an object reception function, and the like. Presently, OBEX specifies the following commands.

| COMMANDS | MEANING |
|---|---|
| Connect | choose your partner, negotiate capabilities |
| Disconnect | signal the end of the session |
| Put | send an object |
| Get | get an object |
| SetPath | modifies the current path on the receiving side |
| Abort | abort the current operation |

The term "connection" has the same meaning as the above "session". In the description below, the term "connection" will be used instead of the expression "session". The OBEX is described in detail in "Infrared Data Association, IrDA Object Exchange Protocol (IrOBEX) with Published Errata, Version 1.2, April 1999" and is incorporated herein by reference.

The basic imaging profile (hereinafter referred to as "BIP") conforms to the OBEX protocol, described above. Version 1.0 of the BIP defines six use scenarios. These six use scenarios are called features and include image push, image pull, remote display, remote camera, advanced image print, and automatic archive. Each of these features specifies a procedure for exchanging still images between devices and a procedure for transmitting and receiving data utilizing the OBEX protocol.

A detailed description of each feature is described in BIP specifications laid open by the Bluetooth SIG. According to the BIP specification, devices are classified into initiators and responders in accordance with their rolls. For example, with the image push feature, the initiator is defined to make request for the start of an image transmission and the like. The responder is defined to receive images transmitted by the initiator. With the remote camera feature, the initiator is defined to make request for acquisition of images. The responder is defined to provide images. The initiator and the responder are also described in the BIP specifications in detail.

The remote camera feature, one of the BIP features, specifies four functions including GetMonitoringImage, GetImageProperties, GetImage, and GetLinkedThumbnail. These functions allow the initiator to acquire information on images from the responder under the OBEX protocol. The BIP specifications describe the configurations of an OBEX request and response packets for each function, an exchange procedure, and the like in detail. The responder for the remote camera feature is assumed to be a device such as a digital camera which has a function of capturing images.

The BIP specifies the six features as described above. However, devices in accordance with the BIP do not support all of these six features. Different devices may have different support forms. For example, a certain device in accordance with the BIP supports only the image push and pull features but not the other features. Another devices in accordance with the BIP supports only the image push and remote display features.

To enable certain device to browse and acquire images saved in another device, it is essential that both of these devices, acting as an initiator and a responder, respectively, support the BIP image pull feature. For example, even if a plurality of images are saved in responder comprising the remote camera feature, initiator that does not comprise the image pull feature but only the remote camera feature cannot browse or acquire these images.

It is contemplated that if a device comprising only the remote camera feature comprises an FTP (File Transfer Protocol) function, it may use the FTP function to acquire images. However, the FTP treats images simply as files without distinguishing them from other kinds of information. In view of users' operability, it is preferable to treat images as images. For example, an image providing mechanism is preferably implemented with which an operator of certain device can cause images saved in another device to be displayed on a screen of the operator's device and select one of the images to be acquired. Even if a remote camera feature operation screen is improved and made more sophisticated so as to display images, it is not available if the FTP is used to acquire files.

BRIEF SUMMARY OF THE INVENTION

The present invention is directed to provide an apparatus, method and computer program that contributes to allowing an image providing function based on wireless communications to be utilized and operated easily and efficiently.

According to an aspect of the present invention, there is provided a wireless communication apparatus which provides a plurality of images stored in a storage to an initiating wireless communication apparatus through wireless communications. A reception unit receives an image acquisition request message transmitted from the initiating wireless communication apparatus. The message conforms to a camera control protocol for exchanging information relating to images. A selection unit selects, in response to the image acquisition request message, one of the plurality of images stored in the storage. A transmission unit then transmits a response message to the initiating wireless communication apparatus in accordance with the camera control protocol. Information relating to the one of the plurality of images that is selected by the selection unit is contained in the response message.

DETAILED DESCRIPTION OF THE INVENTION

FIRST EMBODIMENT

Figure 1:
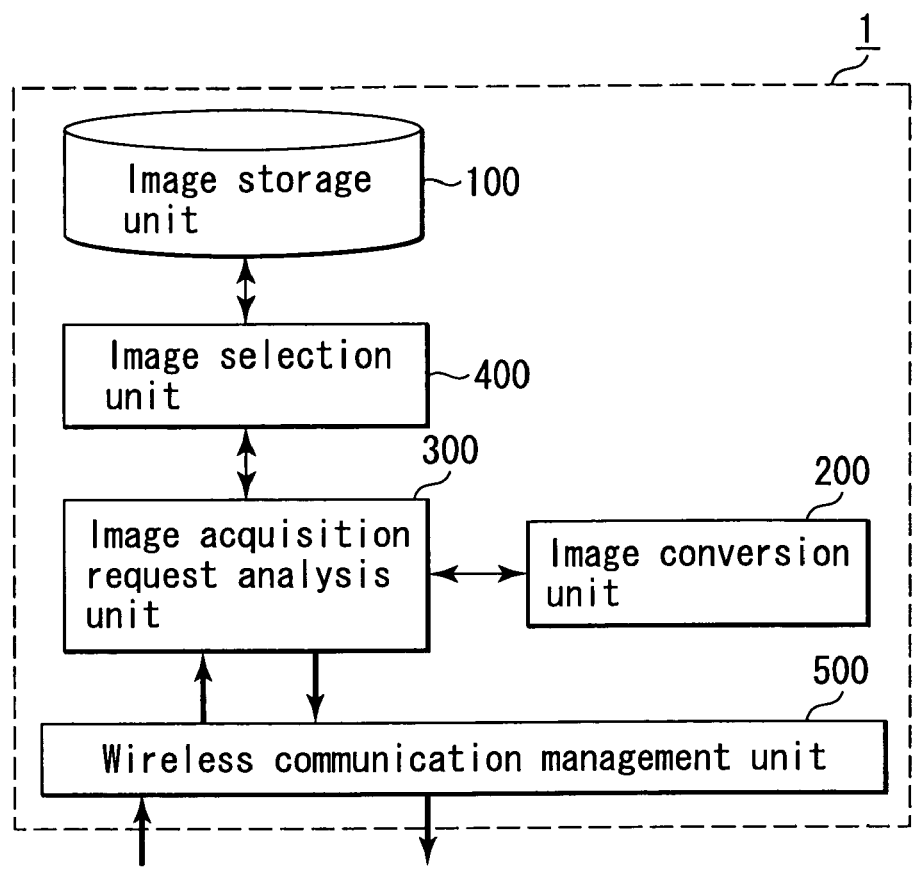
FIG. 1 is a block diagram schematically showing a wireless communication apparatus according to embodiments of the present invention.

A first embodiment will be described below with reference to FIGS. 1 to 4. FIG. 1 is a block diagram schematically showing a wireless communication apparatus (hereinafter simply referred to as "apparatus") according to embodiments of the present invention. An apparatus 1 comprises a wireless transmission and reception function using, for example, Bluetooth as a wireless communication scheme and can carry out wireless transmission and reception in accordance with the Bluetooth communication protocol. The apparatus 1 is assumed to support Basic Imaging Profile (hereinafter referred to as BIP) services.

As shown in FIG. 1, the apparatus 1 includes an image storage unit 100, an image conversion unit 200, an image acquisition request analysis unit 300, an image selection unit 400, and a wireless communication (Bluetooth) management unit 500. The apparatus 1 comprises general hardware elements such as a CPU, a memory, and a system bus. However, for the convenience of description, their illustration is omitted.

An SDP (Service Discovery Protocol) and an OBEX (Object Exchange Protocol) are assumed to be included in a protocol stack for the wireless communication management unit 500, including a radio transmission and reception device that uses Bluetooth as a communication method as well as the Bluetooth communication protocol. This enables the wireless communication management unit 500 to communicate with surrounding other Bluetooth apparatuses in accordance with an SDP or OBEX communication procedure. For example, upon receiving a request for acquisition of service information from another Bluetooth apparatus in accordance with the SDP, the apparatus 1 responds its service information. On the other hand, upon receiving a request for an OBEX connection, the apparatus 1 sets an OBEX connection. Upon receiving a request for an OBEX disconnection, the apparatus 1 clears the OBEX connection.

The wireless communication management unit 500 receives an OBEX request packet from another Bluetooth apparatus. The received OBEX request packet is analyzed by the image acquisition request analysis unit 300 in the apparatus 1. On the basis of the results of analysis of this OBEX request packet, the image acquisition request analysis unit 300 gives an instruction to the image selection unit 400 or the image conversion unit 200 and prepares and transmits information on the requested image to the wireless communication management unit 500, as required. Here, the "information on an image" means data (image data) on the image itself, an identifier for uniquely identifying the image, data on the image obtained by subjecting the image to image processing, and information on the attributes (properties) of the image. The "information on an image" will hereinafter be referred to be as "image information".

Upon receiving inputted image information from the image acquisition request analysis unit 300, the wireless communication management unit 500 constructs an appropriate OBEX response packet containing the inputted image information. The wireless communication management unit 500 then returns this packet through wireless communication to the Bluetooth apparatus that has issued the OBEX request packet. The apparatus 1 according to the present embodiment can exchange data through the wireless communication management unit 500 in response to a request from another Bluetooth apparatus.

The image storage unit 100 has a function of electronically storing and retaining image data. It can provide the image data to the image selection unit 400 in response to an instruction from the image unit 400. If for example, the image storage unit 100 stores and retains image data in a file format, it may provide the image selection unit 400 with all data from an image file or pointer information on the image file stored in the image storage unit 100.

The image selection unit 400 has a function of selecting one of the images stored and retained in the image storage unit 400 in accordance with an instruction from the image acquisition request analysis unit 300. The image selection unit 400 also has a function of outputting image information on the selected image to the image acquisition request analysis unit 300. The image selection unit 400 may provide the image acquisition request analysis unit 300 with all data from an image file or pointer information on the image file stored in the image storage unit 100.

The image conversion unit 200 has a function of converting the size or format of an image. It also has a function of providing the image acquisition request analysis unit 300 with a converted image upon receiving image data and information on a converted size or format inputted by the image acquisition request analysis unit 300. The image acquisition request analysis unit 300 may input to the image conversion unit 200 all data from an image file or pointer information on the image file stored in the image storage unit 100. As converted image data, the image conversion unit 200 may provide all data from an image file to the image acquisition request analysis unit 300. Alternatively, the image conversion unit 200 may provide the image acquisition request analysis unit 300 with pointer information on the file if the image data is temporarily stored in the image storage unit 100 in a file format.

The apparatus 1 according to various embodiments of the present invention, described below, is assumed to be a responder supporting the remote camera feature. As described above, with the remote camera feature, assumed to be a control protocol for the exchange of images picked up by a camera, the initiator issues a request for acquisition of an image. The responder provides the image. The responder supporting the remote camera feature is assumed to be an apparatus such as a digital camera which has a capture function. The present invention may be implemented as an apparatus that does not comprise any image capture functions but only an image providing function according to the present invention based on the remote camera feature. Such the apparatus may be assumed to be one of various apparatuses, including portable information recording apparatuses, cellular telephones, personal information managers (PIMs), personal computers, and Internet electric appliances.

The image acquisition request analysis unit 300 has a function of correctly determining, upon receiving inputted information on an OBEX request packet from the wireless communication management unit 500, whether the request is for the GetMonitoringImage, GetImageProperties, GetImage, or GetLinkedThumbnail function, which is specified in the remote camera feature, one of the BIP features. The image acquisition request analysis unit 300 instructs the image selection unit 400 to select one image data and then receives the selected image data from the image selection unit 400. The image acquisition request analysis unit 300 also examines the image data selected by the image selection unit 400 to acquire property information such as size and format information. The image acquisition request analysis unit 300 also outputs image information to the wireless communication management unit 500. The image acquisition request analysis unit 300 may output to the wireless communication management unit 500 the image data itself selected by the image selection unit 400, image data converted by the image conversion unit 200, or the property information acquired by the image acquisition request analysis unit 300.

Figure 2:
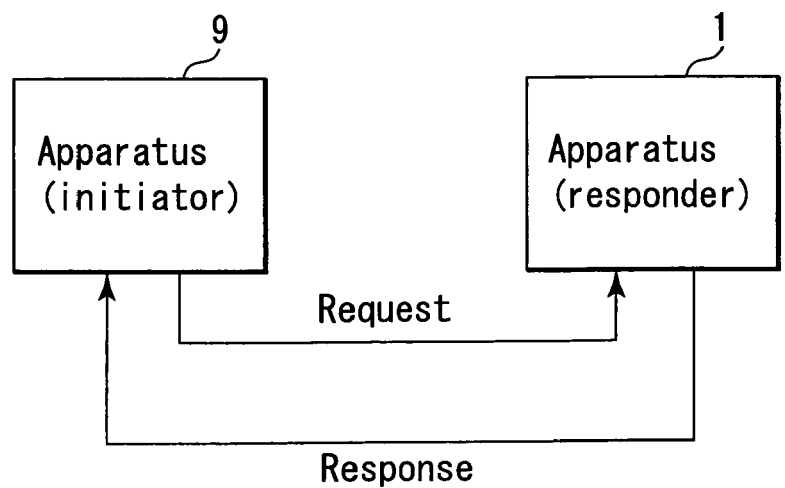
FIG. 2 is a diagram showing a topology of communication between the wireless communication apparatus according to the embodiments of the present invention and another wireless communication apparatus.

FIG. 2 is a diagram showing a topology of communication between an apparatus 9 and the apparatus 1, which are wirelessly coupled together. The apparatus 9 is an initiator that supports the remote camera feature. The apparatus 1, in which the present invention is embodied, is a responder that supports the remote camera feature as described above. Description will be given below of operations of embodiments according to the present invention on the basis of an example of data exchange between the apparatus 9 and the apparatus 1.

The image storage unit 100 is assumed to store and retain N images consisting of images 1 to N. An "image x" is an identifier that identifies an image stored in the image storage unit 100. If for example, the image storage unit 100 retains three image files names "Kobe.jpg", "Osaka.jpg", and "Kyoto.jpg", then N=3 and the file "Kobe.jpg" is an image 1, the "Osaka.jpg" is an image 2, and the file "Kyoto.jpg" is an image 3.

First, the apparatus 9 discovers the apparatus 1 in accordance with the Bluetooth communication protocol. Then, the apparatus 9 retrieves a communication service for the apparatus 1 and then sets a connection between the apparatus 9 and the apparatus 1 in accordance with the OBEX protocol. Since the apparatus 9 supports the remote camera feature, it can set an OBEX connection used to exchange data in accordance with the remote camera feature. The apparatus 9 can also transmit a GetMonitoringImage request to the apparatus 1.

The wireless communication management unit 500 receives the GetMonitoringImage request from the apparatus 9, having set the OBEX connection. The wireless communication management unit 500 then notifies the image acquisition request analysis unit 300 that it has received the request. Upon receiving the notification indicating the reception of the GetMonitoringImage request, the image acquisition request analysis unit 300 outputs an image selection request signal to the image selection unit 400. Upon receiving the inputted image selection request signal, the image selection unit 400 randomly selects one of the images 1 to N, stored and retained in the image storage unit 100. The image selection unit 400 then outputs image information on the selected image k to the image acquisition request analysis unit 300.

Upon receiving the inputted image data on the image k, the image acquisition request analysis unit 300 requests that the image conversion unit 200 create a thumbnail image of the image k. The image conversion unit 200 creates a thumbnail image of the image k in accordance with the request. It then outputs the thumbnail image to the wireless communication management unit 500.

Upon receiving the inputted thumbnail image information, the wireless communication management unit 500 creates a response packet in accordance with the OBEX protocol. The wireless communication management unit 500 transmits the response corresponding to the GetMonitoringImage request to the apparatus 9. This response packet contains data on the thumbnail image. Upon receiving all of the response corresponding to the GetMonitoringImage request from the apparatus 1, the apparatus 9 can generate and display a thumbnail image from the thumbnail image data contained in the received response.

The GetMonitoringImage request contains a parameter called StoreFlag. The value of the StoreFlag (true or false value, true=1, false=0) indicates whether or not to request an identifier for the photographed (captured) image. If the StoreFlag is 1, the image acquisition request analysis unit 300 stores and retains the image information on the image k in an internal buffer. The buffer preferably includes a memory (cache) that can perform a fast read or write operation. Furthermore, if the StoreFlag is 1, the response corresponding to the GetMonitoringImage request contains the identifier (called ImageHandle) for the image k. After the response corresponding to the GetMonitoringImage request, the apparatus 9 transmits a GetImageProperties request, GetImage request, or GetLinkedThumbnail request containing the identifier (ImageHandle) for the image k. Upon being notified through the wireless communication management unit 500 that one of these requests has been received, the image acquisition request analysis unit 300 outputs the image information on the image k to the wireless communication management unit 500. In particular, upon receiving a GetImage request or GetLinkedThumbnail request, the image acquisition request analysis unit 300 uses the image conversion unit 200 to convert the size or format of the image k and outputs the converted image information to the wireless communication management unit 500, as required.

Upon receiving the image information on the image k corresponding to the GetProperties request, GetImage request, or GetLinkedThumbnail request from the image acquisition request analysis unit 300, the wireless communication management unit 500 creates a response packet in accordance with the OBEX protocol. The wireless communication management unit 500 transmits a response corresponding to one of these requests to the apparatus 9. This response packet contains the image information on the image k. Upon receiving all of the response corresponding to the request from the apparatus 1, the apparatus 9 can acquire the image information on the image k contained in the received response.

Figure 3:
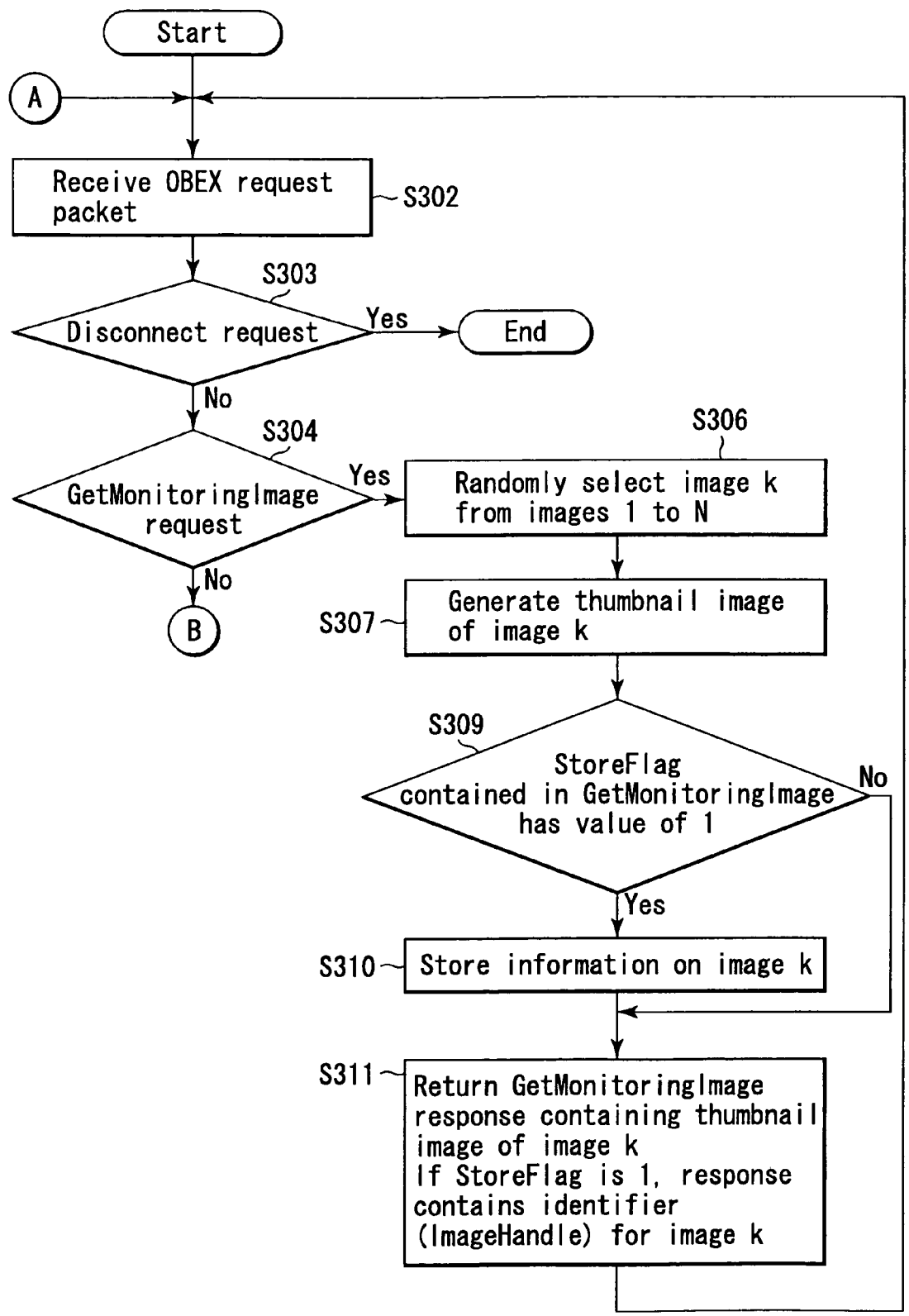
FIG. 3 is a flowchart showing a part of a specific process procedure according to a first embodiment.
Figure 4:
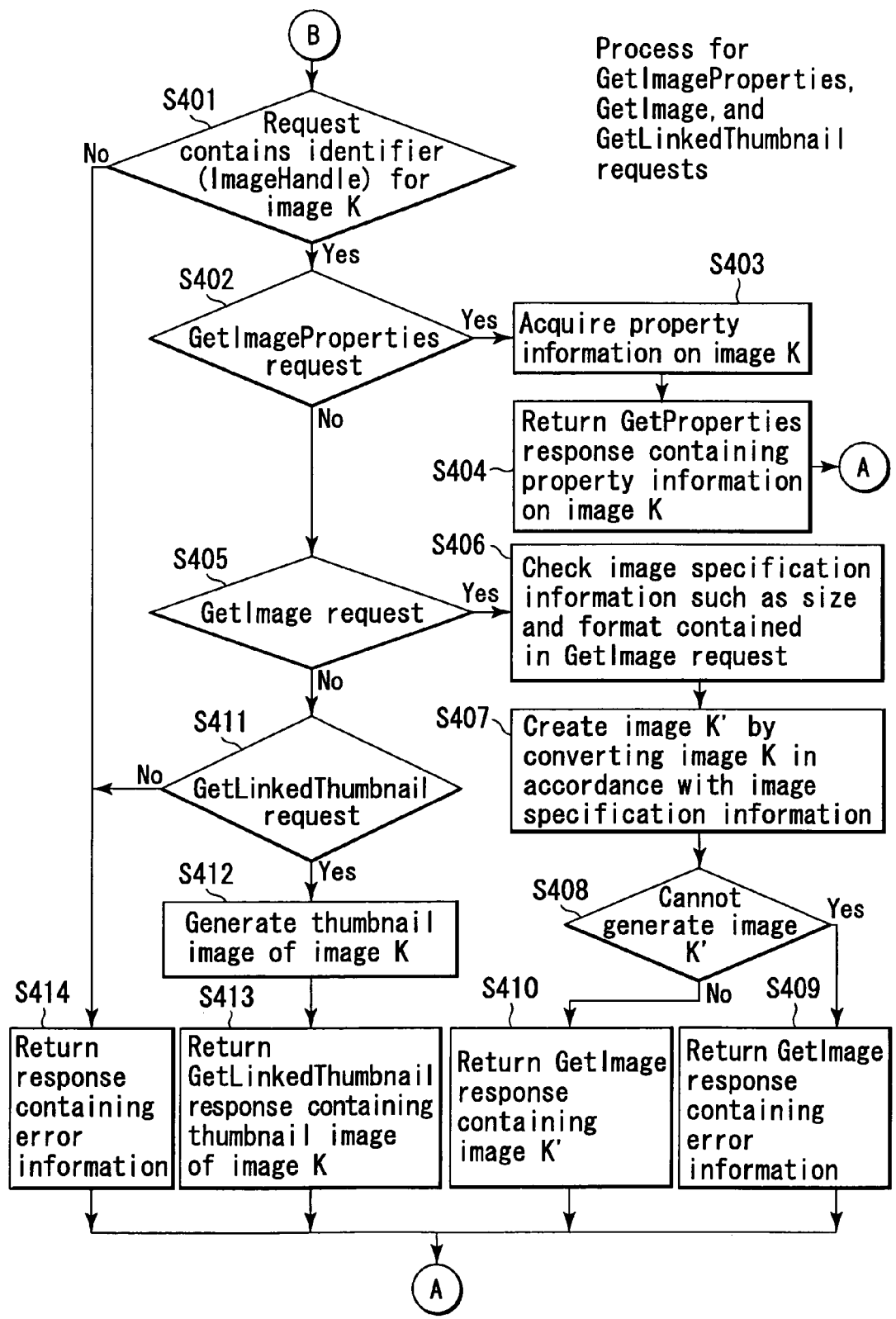
FIG. 4 is a flowchart showing the other parts of the specific process procedure according to the first embodiment.

FIG. 3 is a flowchart showing a part of a specific process procedure according to the first embodiment. FIG. 4 is a flowchart showing the other parts of this process procedure. It is assumed that an OBEX connection based on the BIP remote camera feature has already been set.

As shown in FIG. 3, first, in step S302, an OBEX request packet is received. In step S303, it is determined whether or not the received OBEX packet is for a disconnect request. If the packet is for a disconnect request, the connection to the initiator is cleared to finish the process. If the packet is not for a disconnect request, the process proceeds to step S304.

In step S304, it is determined whether or not the received OBEX packet is for a GetMonitoringImage request. If the packet is for a GetMonitoringImage request, the process proceeds to step S306 and otherwise to step S401 in FIG. 4. Steps S306 to S311 are a response process corresponding to the GetMonitoringImage request and correspond to the process relating to image provision according to the present embodiment, described above.

Subsequently, the image k is randomly selected from the images 1 to N (step S306). A thumbnail image of the selected image k is generated (step S307). In step S307, a thumbnail image need not be generated every time the image k is selected. If a separate thumbnail image is already retained, this image data may be utilized as it is.

Then, in step S309, it is determined whether or not the StoreFlag contained in the GetMonitoringImage request has a value of 1. If the StoreFlag has a value of 1,then in step S310, the information on the image k is stored. Then, the process proceeds to step S311. If the StoreFlag does not have a value of 1,step S310 is skipped and the process proceeds to step S311.

In step S311, a GetMonitoringImage response containing the thumbnail image of the image k is returned to the initiator. The process then returns to step S302. However, in step S311, if the StoreFlag has a value of 1, the response is returned together with the identifier (ImageHandle) for the image k.

FIG. 4 shows a process procedure executed when a request other than GetMonitoringImage is received. If it is determined that the received OBEX request packet is not for a GetMonitoringImage request, it is determined whether or not the request contains the identifier (ImageHandle) for the image k (step S401). The request is assumed to be one of GetImageProperties, GetImage, and GetLinkedThumbnail. If the request does not contain the identifier (ImageHandle) for the image k, the process proceeds to step S414 to return a response containing error information. Otherwise, the process described below is executed depending on the type of the request.

If the request is GetImageProperties (step S402), property information on the image k is acquired (step S403). A GetProperties response is generated and returned which contains the property information on the image k (step S404).

If the request is GetImage (step S405), image specification information such as a size and a format is referenced and checked which is contained in the GetImage request (step S406). In accordance with the image specification information, the image k is converted into an image k' (step S407). If the image k' cannot be created (step S408), a GetImage response containing error information is returned (step S409). On the other hand, if the image k' can be correctly created, a GetImage response containing the image k' is returned (step S410).

If the request is GetLinkedThumbnail (step S411), a thumbnail image of the image k is created (step S412). A GetLinkedThumbnail response containing the thumbnail image of the image k is returned (step S413).

Upon finishing the process procedure to be executed when the request other than GetMonitoringImage, described above, is received, the procedure returns to the process of receiving an OBEX request packet (step S302 in FIG. 3).

In the present embodiment, the image selection unit 400 randomly selects one of the images 1 to N retained in the image storage unit 100. However, the images may be sequentially selected in the order of, for example, the image 1, the image 2, According to the first embodiment, described above, the apparatus 1 can operate as a responder in accordance with the BIP remote camera feature. The apparatus 1 can utilize the functions specified in the remote camera feature to provide information on image data retained in the apparatus 1 to the apparatus 9, acting as an initiator and also comprising the BIP remote camera feature.

SECOND EMBODIMENT

A second embodiment of the present invention adds functions to the image acquisition request analysis unit 300, described in the first embodiment. As in the case with the first embodiment, in the second embodiment, the image storage unit 100 is assumed to store N images consisting of images 1 to N. Upon receiving a notification indicating that a GetMonitoringImage request has been received, the image acquisition request analysis unit 300 outputs an image selection request signal to the image selection unit 400. Upon receiving the inputted image unit request signal, the image selection unit 400 randomly selects one of the images 1 to N stored and retained in the image storage unit 100. The image selection unit 400 outputs image information on the selected image k to the image acquisition request analysis unit 300. Upon receiving the inputted image information on the image k, the image acquisition request analysis unit 300 issues a request for creation of a thumbnail image of the image k to image conversion unit 200. The image conversion unit 200 creates a thumbnail image of the requested image k. The image conversion unit 200 then outputs the thumbnail image to the wireless communication management unit 500.

In the second embodiment, the image acquisition request analysis unit 300 is configured to store the image information on the image k for a specified time. This image information contains the thumbnail image of the image k. The specified time is, for example, five seconds. If the image acquisition request analysis unit 300 is notified again within the specified time that a GetMonitoringImage has been received, it outputs the stored thumbnail image information on the image k without outputting an image selection request signal to the image selection unit 400.

Figure 5:
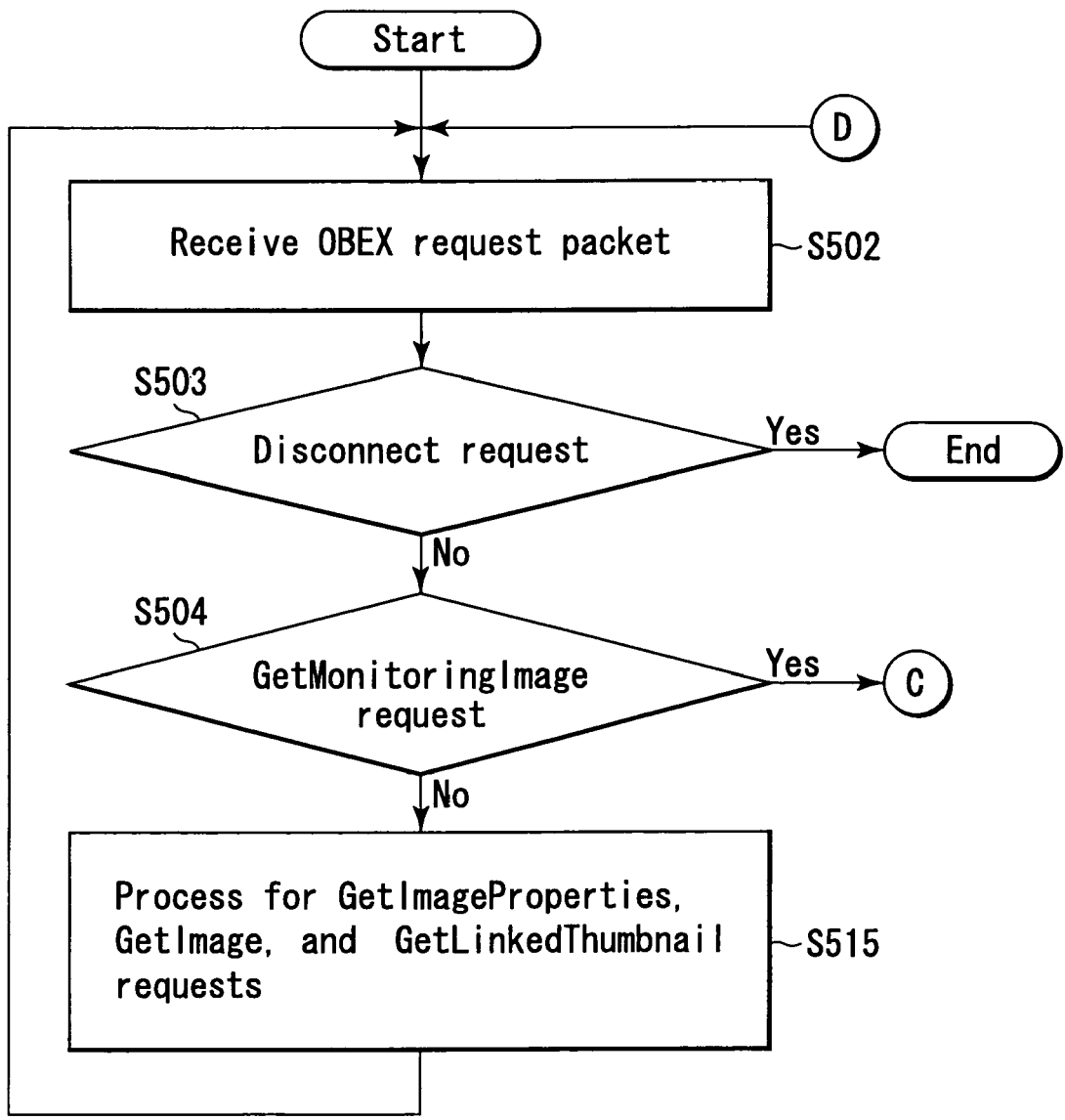
FIG. 5 is a flowchart showing a part of a specific process procedure according to a second embodiment of the present invention.
Figure 6:
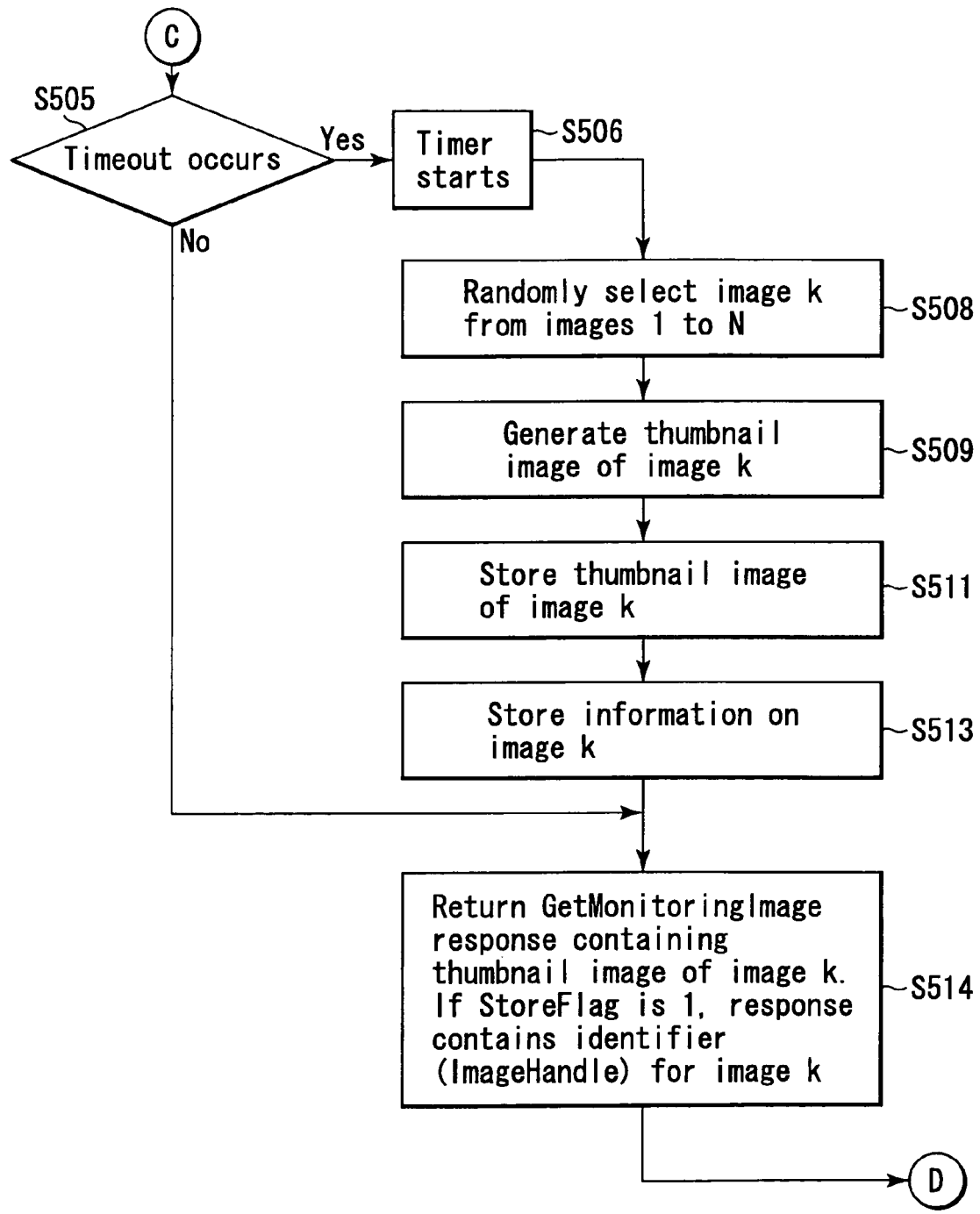
FIG. 6 is a flowchart showing the other parts of the specific process procedure according to the second embodiment.

FIG. 5 is a flowchart showing a part of a specific process procedure according to the second embodiment. FIG. 6 is a flowchart showing the other parts of this specific process procedure. It is assumed that an OBEX connection based on the BIP remote camera feature has already been set.

As shown in FIG. 5, in step S502, an OBEX request packet is received. In step S503, it is determined whether or not the received OBEX packet is for a disconnect request. If the packet is for a disconnect request, the connection to the initiator is cleared to finish the process. If the packet is not for a disconnect request, the process proceeds to step S504.

In step S504, it is determined whether or not the received OBEX packet is for a GetMonitoringImage request. If the packet is for a GetMonitoringImage request, the process proceeds to step S505 in FIG. 6 and otherwise to step S515. Step S515 is a process procedure executed when the request other than GetMonitoringImage is received, and is similar to that shown in FIG. 4.

Steps S505 to S514, shown in FIG. 6, are a response process corresponding to the GetMonitoringImage request and correspond to the process relating to image provision according to the second embodiment, described above.

In step S505, it is determined whether or not a timer has timed out. The timer does not actually time out under initial conditions. However, it is exceptionally determined that timeout has occurred, and the process proceeds to step S506 to set the timer. In other words, in the process for the first GetMonitoringImage request in the process procedure, step S505 is skipped.

Subsequently, the image k is randomly selected from the images 1 to N (step S508). A thumbnail image of the selected image k is generated (step S509). The generated thumbnail image is internally stored and retained in step S511. In step S513, information on the image k is stored, and the process proceeds to step S514.

In step S514, a GetMonitoringImage response containing the thumbnail image of the image k is returned to the initiator. The process then returns to step S502. If in step S514, the StoreFlag is 1, the response is returned together with the identifier (ImageHandle) for the image. If in step S505, it is not detected that the timer has timed out, steps S506 to S513, described above, are skipped. Then, the thumbnail image of the image k internally stored and retained for the specified time is used as it is. The GetMonitoringImage response containing the thumbnail image is returned.

In the present embodiment, the image selection unit 400 randomly selects one of the images 1 to N retained in the image storage unit 100. However, the images may be sequentially selected in the order of, for example, the image 1, the image 2, According to the second embodiment, described above, the apparatus 1 can use the functions specified in the remote camera feature to provide information on image data retained in the apparatus 1 to the apparatus 9, acting as the initiator and comprising the BIP remote camera feature, as in the case with the first embodiment. Furthermore, if the apparatus 1 receives a request for acquisition of an image from the initiator apparatus 9, it undergoes a lighter processing load for image selection than in the first embodiment. Moreover, if the initiator apparatus 9 continuously issues GetMonitoringImage requests, the apparatus 1 according to the present embodiment responds with the same image for a specified time until the timer times out. Therefore, the user can check the same image for the specified time. This is preferable in implementing an image browsing process.

THIRD EMBODIMENT

A third embodiment of the present invention adds functions to the image selection unit 400, described in the first embodiment. As in the case with the first embodiment, in the third embodiment, the image storage unit 100 is assumed to store N images consisting of images 1 to N. Every time the wireless-communication management unit 500 notifies the image acquisition request analysis unit 300 that a GetMonitoringImage request has been received, the image acquisition request analysis unit 300 outputs an image unit request signal to the image selection unit 400.

In the third embodiment, the image selection unit 400 has a function of detecting that the wireless communication management unit 500 has generated an OBEX connection. The image selection unit 400 also has a timer function and a function of storing time information.

The image acquisition request analysis unit 300 inputs an image selection request to the image selection unit 400. Then, if the image selection request signal has been inputted for the first time after the OBEX connection has been generated, then the image selection unit 400 outputs information on the image 1 of the images 1 to N, stored and retained in image storage unit 100, to the image acquisition request analysis unit 300. The image selection unit 400 also stores the time when it has received the image selection request signal, as first time information. It also stores the time when it has received the image selection request signal, separately as the time when a GetMonitoringImage request has been started. Then, the image selection unit 400 initializes the value of an image number used as internal information, to 0.

Upon receiving the second image selection request signal, the image selection unit 400 stores the time of the reception as second time information if the image number has a value of 0. The image selection unit 400 compares the first time information with the second time information. If the difference between these two times is T1 seconds or shorter, the image selection unit 400 outputs the information on the image 1 to the image acquisition request analysis unit 300. Otherwise, the image selection unit 400 outputs information on image 2 stored and retained in the image storage unit 100 to the image acquisition request analysis unit 300. The image selection unit 400 stores the second time information as the first time information.

A similar process is executed for the third and subsequent image selection request signals. After outputting the image information on the image k to the image acquisition request analysis unit 300 and upon receiving an inputted image selection request signal, the image selection unit 400 stores the time of the reception as the second time information if the image number has a value of 0. The image selection unit 400 compares the first time information with the second time information. If the difference between these two times is T1 seconds or shorter, the image selection unit 400 outputs the information on the image k to the image acquisition request analysis unit 300. Otherwise, the image selection unit 400 outputs information on image k+1 stored and retained in the image storage unit 100 to the image acquisition request analysis unit 300. If k=N, the image selection unit 400 outputs the information on the image 1 to the image acquisition request analysis unit 300 as the image k+1.

The image selection unit 400 compares the time when the x-th image selection request signal has been inputted with the time when the GetMonitoringImage request has been started.

If the difference between these two times is (x-1)×T2 is shorter, the image selection unit 400 determines that the apparatus 9 periodically transmits a GetImage request, to start the timer at this point in time. If it is assumed that the image selection unit 400 has outputted information on image j to the image acquisition request analysis unit 300 before the start of the timer, j is stored as the image number. Every time timeout occurs, the image selection unit 400 adds one to the value of the image number. It is assumed that if j=N, the value of j+1 is 1.

Upon receiving an inputted image selection request signal, the image selection unit 400 outputs information on an image m of the images 1 to N, stored and retained in the image storage unit 100, to the image acquisition request analysis unit 300 if the image number has a value of m (m is not 0). If the image number has a value of m that is other than 0, the image selection unit 400 avoids comparing the first time information with the second time information and storing the time information upon receiving an inputted image selection request signal as described previously.

Figure 7:
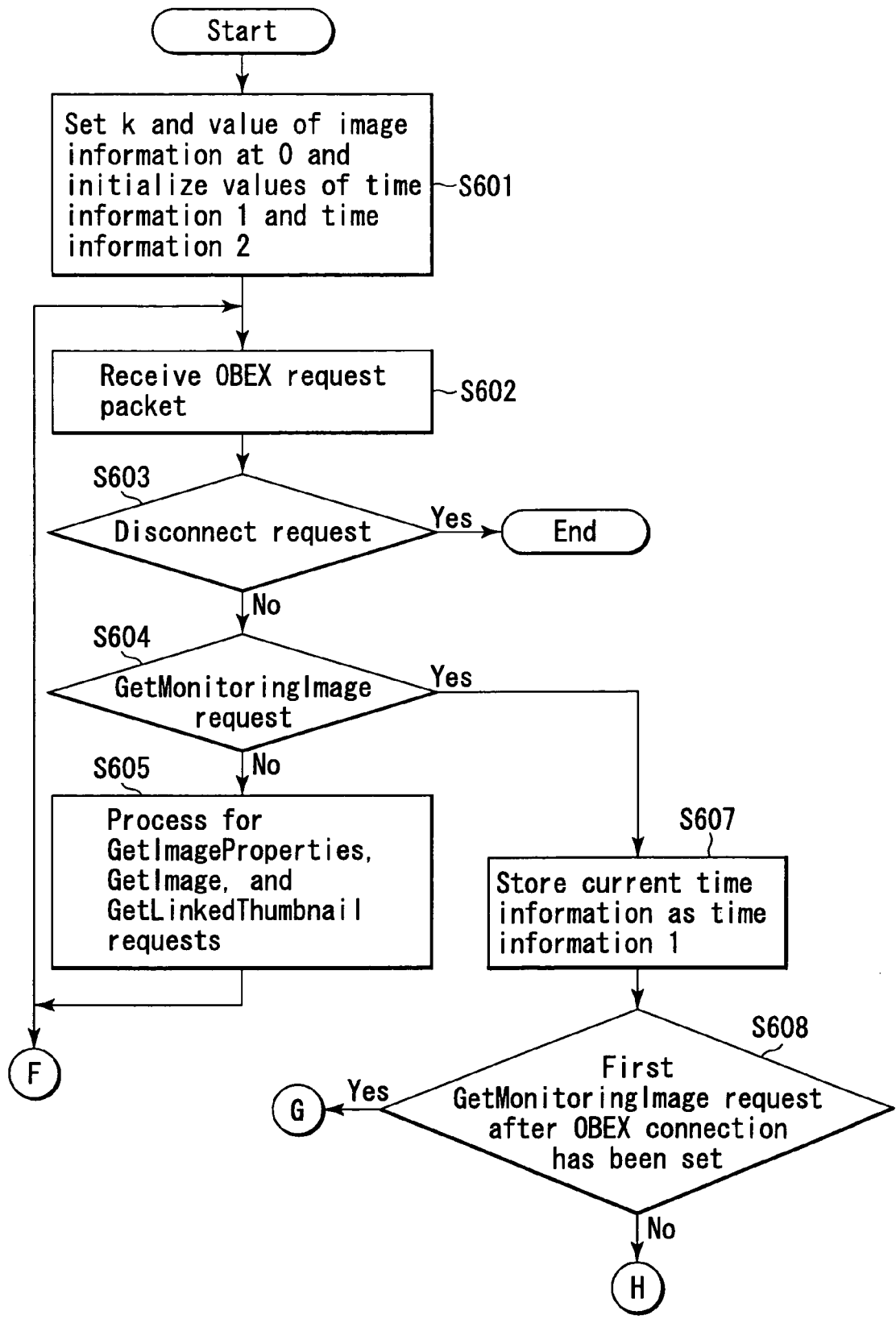
FIG. 7 is a flowchart showing a part of a specific process procedure according to a third embodiment of the present invention.
Figure 8:
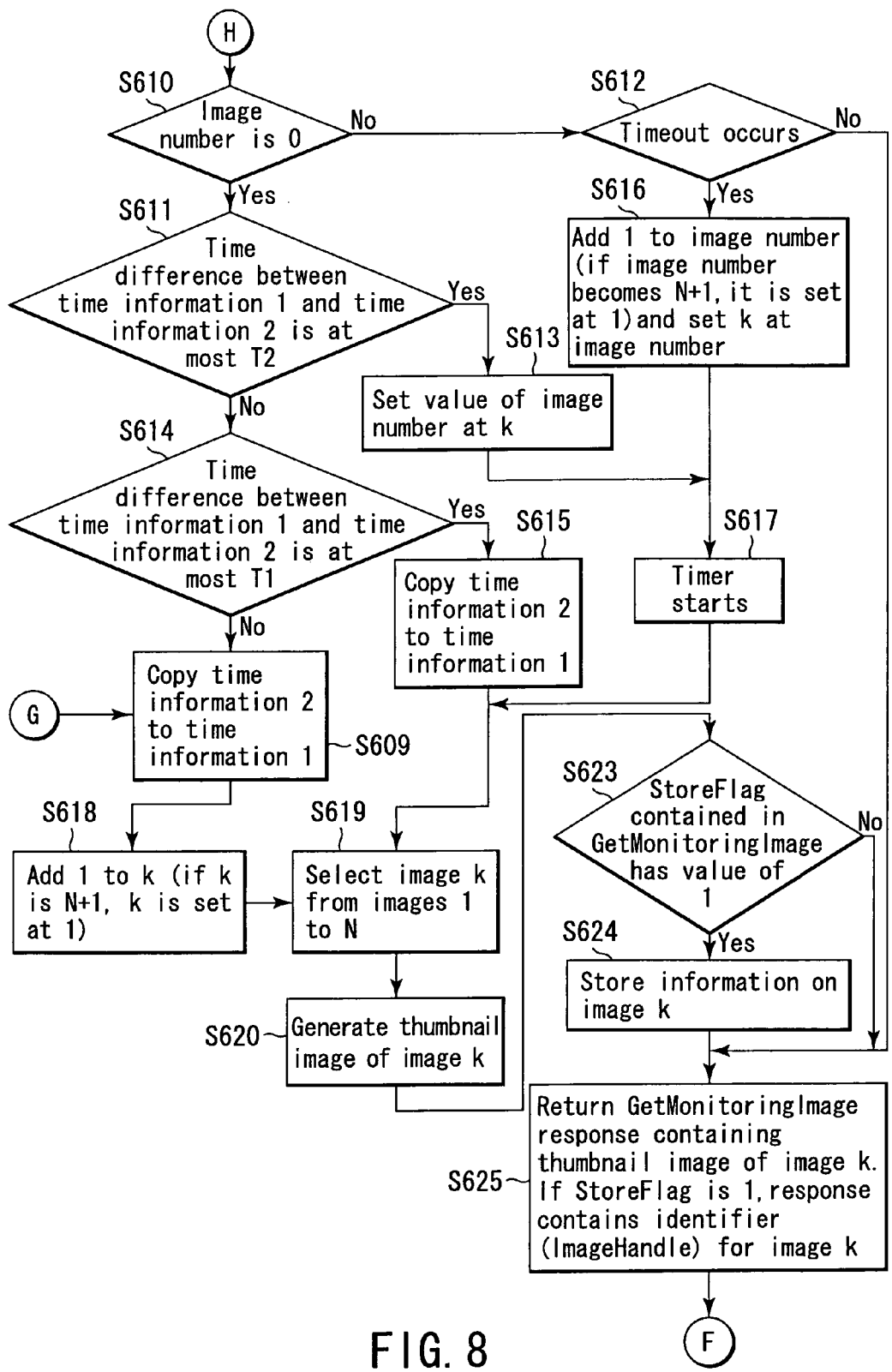
FIG. 8 is a flowchart showing the other parts of the specific process procedure according to the third embodiment.

FIG. 7 is a flowchart showing a part of a specific process procedure according to the third embodiment. FIG. 8 is a flowchart showing the other parts of this specific process procedure. It is assumed that an OBEX connection based on the BIP remote camera feature has already been set. In this flowchart, if the image selection unit 400 compares the time when the x-th image selection request signal has been inputted with the time when the GetMonitoringImage request has been started and the difference between these two times is (x-1)×T2 is shorter as described above, then x has a value of 2. In the present example, the expressions T1 and T2 seconds are used. However, it is allowable that T1>T2 and that T1=5 seconds and T2=3 seconds as a specific example.

As shown in FIG. 7, in step S601, the value of a variable k and a value for the image information on the image k are initialized to 0. Furthermore, time information 1 and time information 2 are each initialized. Then, in step S602, an OBEX request packet is received. In step S603, it is determined whether or not the received OBEX packet is for a disconnect request. If the packet is for a disconnect request, the connection to the initiator is cleared to finish the process. If the packet is not for a disconnect request, the process proceeds to step S604.

In step S604, it is determined whether or not the received OBEX packet is for a GetMonitoringImage request. If the packet is for a GetMonitoringImage request, the process proceeds to step S607 and otherwise to step S605. Step S605 is a process procedure executed when the request other than GetMonitoringImage is received, and is similar to that shown in FIG. 4.

Steps S607 to S625 (see FIG. 8) are a response process corresponding to the GetMonitoringImage request and correspond to the specific process relating to image provision according to the third embodiment.

First, in step S607, the current time information is stored as the time information 1. Then, it is determined whether or not the GetMonitoringImage request in step S604 has been inputted for the first time after the OBEX connection has been set (step S608). If it is determined that the first GetMonitoringImage request has been inputted, the process proceeds to step S609. Otherwise, the process proceeds to step S610 in FIG. 8.

In step S610 in FIG. 8, it is determined whether or not the image number is 0. If the image number is not 0, the process proceeds to step S612. In step S612, it is determined whether or not timer has timeout. If in step S612, it is detected that the timer has timed out, one is added to the value of the image number and the value of the variable k is set equal to the value of the image number(step S616). Subsequently, the timer is started (step S617). If in step S616, the image number has a value of N+1,this value is returned to 1.

In step S610, described above, if the image number is determined to be 0, it is determined in step S611 whether or not the time difference between the time information 1 and the time information 2 is T2 or shorter (step S611). If the time difference is T2 or shorter, the value of the image number is set equal to the value of the variable k (step S613). In step S617, the timer is started. On the other hand, if it is determined in step S611 that the time difference is longer than T2, then it is determined whether or not the time difference between the time information 1 and the time information 2 is T1 or shorter (step S614). If the time difference is T1 or shorter, the time information 1 is copied to the time information 2 (step S615). On the other hand, in step S614, if it is determined that the time difference is longer than T1, the time information 1 is copied to the time information 2 (step S609). Then, one is added to the value of the variable k (step S616). If in step S618, the variable k has a value of N+1, this value is returned to 1.

Then in step S619, the image k is selected from the images 1 to N (step S 619). A thumbnail image of the selected image k is generated (step S620). Subsequently in step S623, it is determined whether or not the StoreFlag contained in the GetMonitoringImage request has a value of 1. If the StoreFlag has a value of 1, then in step S624, information on the image k is stored. The process then proceeds to step S625. If the StoreFlag does not have a value of 1, the process proceeds to step 625 by skipping step S624.

In step S625, a GetMonitoringImage response containing the thumbnail image of the image k is returned to the initiator. The process returns to step S602. In step S625, if the Store-Flag is 1, the response is returned together with the identifier (ImageHandle) for the image k.

According to the third embodiment, described above, the apparatus 1 can use the functions specified in the remote camera feature to provide information on image data retained in the apparatus 1 to the apparatus 9, acting as the initiator and comprising the BIP remote camera feature, as in the case with the first embodiment. Furthermore, it can be determined whether or not the initiator apparatus 9 continuously transmits image acquisition requests. Specifically, the responder apparatus 1 measures the time intervals between image acquisition requests from the initiator apparatus 9. If the time intervals are short in the above case, e.g. 3 to 5 seconds, i.e. image acquisition requests are generated at a high speed, the responder detects this situation in step S611 or S614, described above. The responder then provides the initiator apparatus 9 with the same image (here, a thumbnail image). The initiator apparatus 9, which has requested provision of an image utilizing a GetMonitoringImage request as described above, is provided with the same image at fixed time intervals regardless of the number of requests per unit time. This makes it possible to appropriately browse images provided by the responder apparatus 1 without missing.

FOURTH EMBODIMENT

A fourth embodiment of the present invention adds functions to the image acquisition request analysis unit 300, described in the first embodiment. As in the case with the first embodiment, in the fourth embodiment, the image storage unit 100 is assumed to store N images consisting of images 1 to N.

In the fourth embodiment, the image acquisition request analysis unit 300 is assumed to be able to store image information on the image k and to store no image information in its initial conditions. This image information contains a thumbnail image of the image k. When the wireless communication management unit 500 notifies the image acquisition request analysis unit 300 that a GetMonitoringImage has been received, the image acquisition request analysis unit 300 checks the value of the StoreFlag contained in the GetMonitoringImage request. In the present embodiment, when GetMonitoringImage requests are continuously transmitted, if at a certain time, the StoreFlag contained in the GetMonitoringImage has a value of 1 and a thumbnail image has already been transmitted in response to the last request, a thumbnail image of the image k and the image information on the image k, the original of the thumbnail image, are provided. The process procedure of the present embodiment will be described below.

[Process Executed if the StoreFlag has a Value of 0]

If the StoreFlag contained in the GetMonitoringImage request has a value of 0,the image acquisition request analysis unit 300 initializes the internally stored image information. The image acquisition request analysis unit 300 then outputs an image selection request signal to the image selection unit 400. Upon receiving the inputted image selection request signal, the image selection unit 400 randomly selects one of the images 1 to N stored and retained in the image storage unit 100. The image selection unit 400 then outputs the image information on the selected image k to the image acquisition request analysis unit 300.

Upon receiving the inputted image information on the image k, the image acquisition request analysis unit 300 requests that the image conversion unit 200 create a thumbnail image of the image k. Then, the image conversion unit 200 creates a thumbnail image of the requested image k and then outputs the thumbnail image and the value of the StoreFlag (in this case, 0) to the wireless communication management unit 500. The image acquisition request analysis unit 300 internally stores the image information on the image k. This image information contains the thumbnail image of the image k.

Upon receiving the inputted thumbnail image information and StoreFlag value, the wireless communication management unit 500 creates a response packet in accordance with the OBEX protocol. The wireless communication management unit 500 then transmits a response corresponding to the GetMonitoringImage request. If the StoreFlag has a value of 0,the response packet contains only the data on the thumbnail image.

[Process Executed if the StoreFlag has a Value of 1]

If the StoreFlag contained in the GetMonitoringImage request has a value of 1,the image acquisition request analysis unit 300 outputs an image unit request signal to the image selection unit 400 if its internally stored image information is in the initial conditions. Upon receiving the inputted image selection request signal, the image selection unit 400 randomly selects one of the images 1 to N stored and retained in the image storage unit 100. The image selection unit 400 then outputs the image information on the selected image k to the image acquisition request analysis unit 300.

Upon receiving the inputted image information on the image k, the image acquisition request analysis unit 300 requests that the image conversion unit 200 create a thumbnail image of the image k. Then, the image conversion unit 200 creates a thumbnail image of the requested image k and then outputs the thumbnail image and the value of the StoreFlag (in this case, 1) to the wireless communication management unit 500. The image acquisition request analysis unit 300 internally stores the image information on the image k. This image information contains the thumbnail image of the image k.

On the other hand, if the internally stored image information is not in the initial conditions, i.e. the image information on the image k is associated with contents, the image acquisition request analysis unit 300 outputs the internally stored thumbnail image of the image k and the internally stored StoreFlag value, to the wireless communication management unit 500. Upon receiving the inputted thumbnail image information and StoreFlag value, the wireless communication management unit 500 creates a response packet in accordance with the OBEX protocol. The wireless communication management unit 500 then transmits the response corresponding to the GetMonitoringImage request to the apparatus 9. The response packet transmitted if the StoreFlag has a value of 1 contains data on the thumbnail image and the identifier (called ImageHandle) for the image k.

Figure 9:
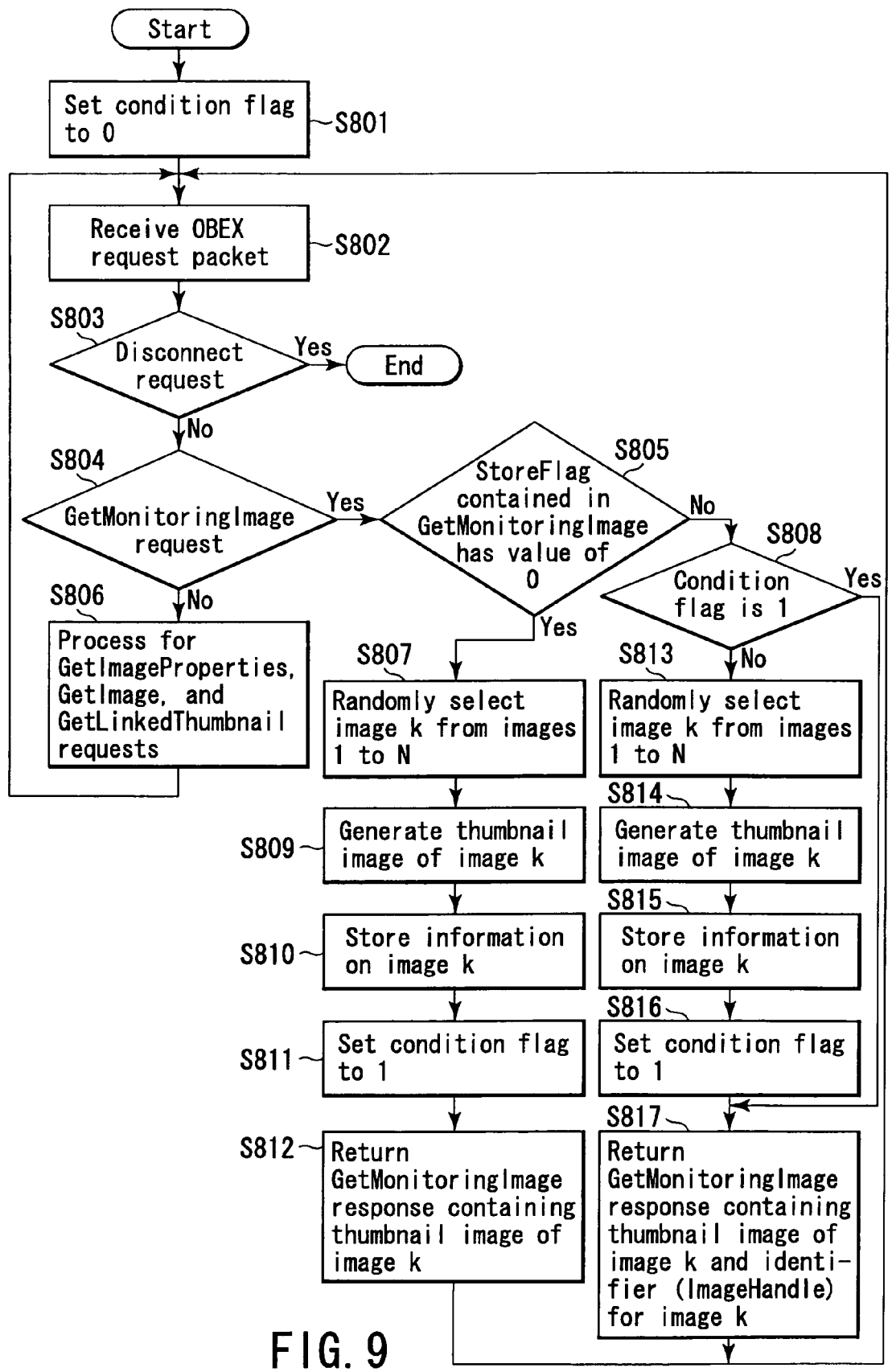
FIG. 9 is a flowchart showing a specific process procedure according to a fourth embodiment of the present invention.

FIG. 9 is a flowchart showing a specific process procedure according to the fourth embodiment. It is assumed that an OBEX connection based on the BIP remote camera feature has already been set.

As shown in FIG. 9, in step S801, a condition flag is initialized to 0.Then, in step S802, an OBEX request packet is received. In step S803, it is determined whether or not the received OBEX packet is for a disconnect request. If the packet is for a disconnect request, the connection to the initiator is cleared to finish the process. If the packet is not for a disconnect request, the process proceeds to step S804.

In step S804, it is determined whether or not the received OBEX packet is for a GetMonitoringImage request. If the packet is for a GetMonitoringImage request, the process proceeds to step S805 and otherwise to step S806. Step S806 is a process procedure executed when the request other than GetMonitoringImage is received, and is similar to that shown in FIG. 4.

Steps S805 to S817 are a response process corresponding to the GetMonitoringImage request and correspond to the process relating to image provision according to the fourth embodiment, described above. First, in step S805, it is determined whether or not the StoreFlag contained in the GetMonitoringImage request has a value of 0.

If the StoreFlag is determined to have a value of 0,the image k is randomly selected from the images 1 to N (step S807). A thumbnail image of the selected image k is generated (step S809). In step S809, the thumbnail image need not always be generated. If a separate thumbnail image is already retained, its image data may be utilized as it is. Then, information on the image k is stored (step S810). The condition flag is se to 1 (step S811). Then in step S812, the GetMonitoringImage response containing the thumbnail image of the image k is returned to the initiator.

On the other hand, if in step S805, the StoreFlag is determined not to have a value of 0 but to have a value is 1,then it is determined in step S808 whether or not the condition flag is 1.In this case, if the condition flag is 1,the process proceeds to step S817. On the other hand, if the flag is not 1 (i.e. the flag is 0), the same process procedure as that of steps S807 to S811 is executed. The process then proceeds to step S817.

In step S817, a GetMonitoringImage response containing the thumbnail image of the image k is returned to the initiator. Then, the process returns to step S802. In step S817, the response is returned together with the identifier (ImageHandle) for the image k.

In the present embodiment, the image selection unit 400 randomly selects one of the images 1 to N retained in the image storage unit 100. However, the images may be sequentially selected in the order of, for example, the image 1, the image 2, ...

In the first embodiment, it is contemplated, if the initiator apparatus 9, displaying and checking the thumbnail image acquired from the apparatus 1, requests that the apparatus 1 acquire image information on the original image (i.e. the image from which the thumbnail image has been generated) corresponding to the currently displayed thumbnail image, the initiator apparatus 9 may be provided with image information on an image different from the currently displayed one. However, according to the fourth embodiment, described above, the true-or-false value of the StoreFlag contained in the GetMonitoringImage request is referenced. Then, when the StoreFlag has a true value (with negative logic, a false value), the cached image k and its image information are selected without randomly selecting the image k. Consequently, the initiator apparatus 9 can reliably acquire image information corresponding to the original image for which the acquisition request has been made.

FIFTH EMBODIMENT

A fifth embodiment of the present invention adds functions to the image acquisition request analysis unit 300, described in the fourth embodiment. As in the case with the fourth embodiment, in the fifth embodiment, the image storage unit 100 is assumed to store N images consisting of images 1 to N. In the fifth embodiment, the image acquisition request analysis unit 300 is assumed to be able to store image information on the image k and its thumbnail image and to store no contents in the initial conditions. Furthermore, the image acquisition request analysis unit 300 internally retains a timer. When the wireless communication management unit 500 notifies the image acquisition request analysis unit 300 that a GetMonitoringImage request has been received, the image acquisition request analysis unit 300 checks the value of the StoreFlag contained in the GetMonitoringImage request. In this point, this embodiment is similar to the fourth embodiment, described above.

Figure 10:
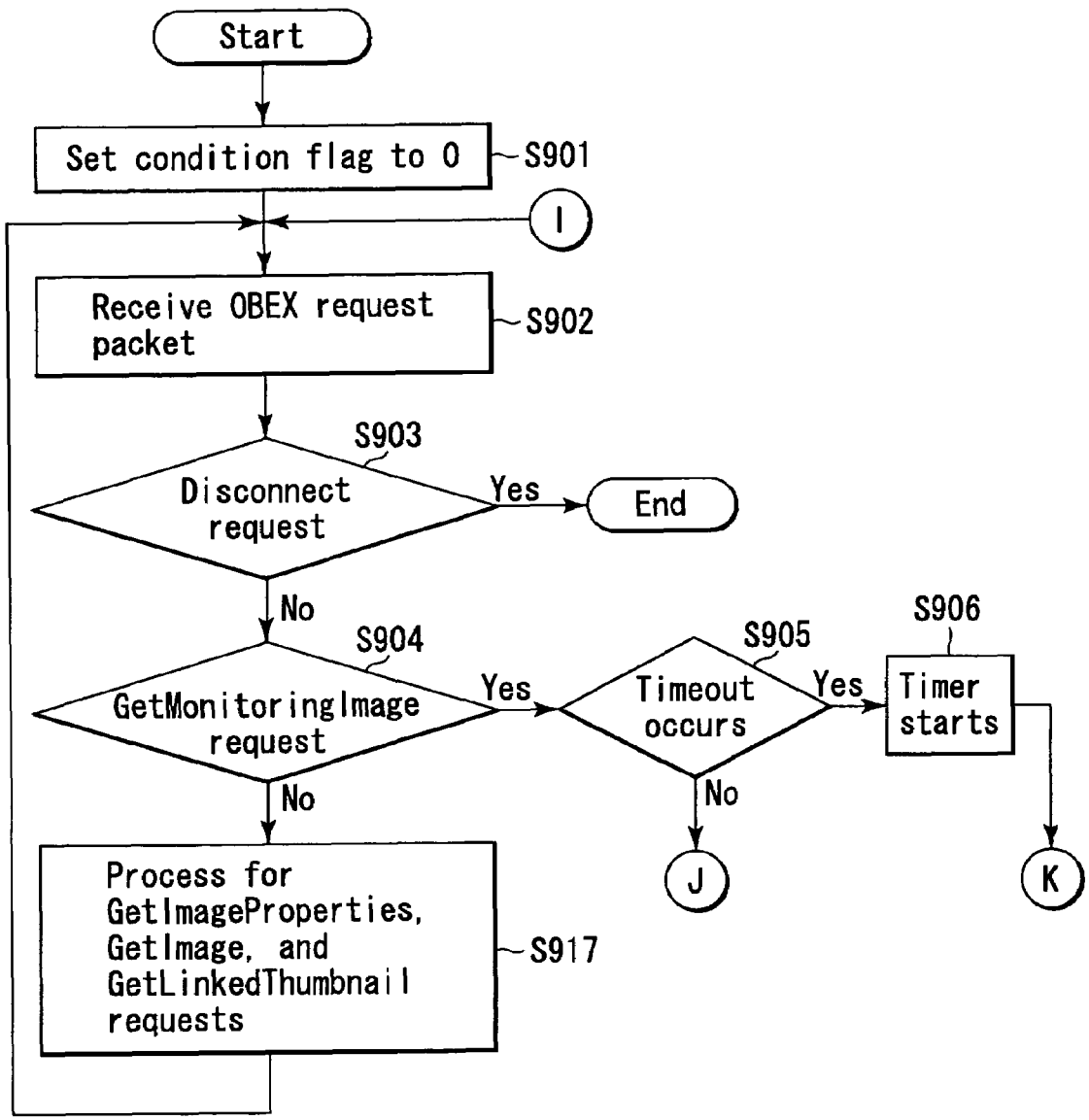
FIG. 10 is a flowchart showing a part of a specific process procedure according to a fifth embodiment of the present invention.
Figure 11:
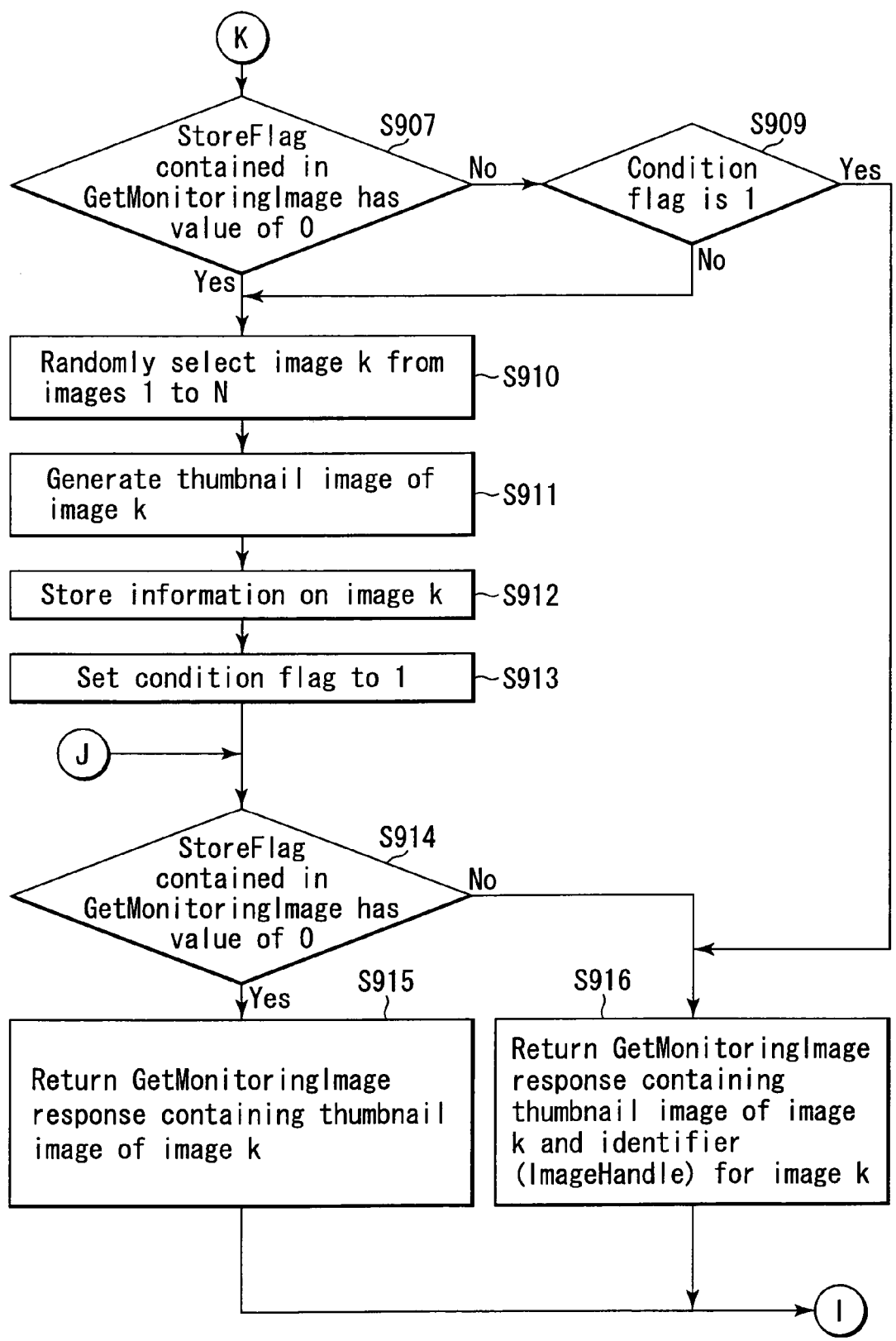
FIG. 11 is a flowchart showing the other parts of the specific process procedure according to the fifth embodiment.

FIG. 10 is a flowchart showing a part of a specific process procedure according to the fifth embodiment. FIG. 11 is a flowchart showing the other parts of this specific process procedure. It is assumed that an OBEX connection based on the BIP remote camera feature has already been set.

As shown in FIG. 10, in step S901, the condition flag is initialized to 0. Then, in step S902, an OBEX request packet is received. In step S903, it is determined whether or not the received OBEX packet is for a disconnect request. If the packet is for a disconnect request, the connection to the initiator is cleared to finish the process. If the packet is not for a disconnect request, the process proceeds to step S904.

In step S904, it is determined whether or not the received OBEX packet is for a GetMonitoringImage request. If the packet is for a GetMonitoringImage request, the process proceeds to step S905 and otherwise to step S917. Step S917 is a process procedure executed when the request other than GetMonitoringImage is received, and is similar to that shown in FIG. 4.

Steps S905 to S916 (see FIG. 11) are a response process corresponding to the GetMonitoringImage request and correspond to the process relating to image provision according to the fifth embodiment, described above.

In step S905, it is determined whether or not the timer has timed out. The timer does not actually time out under the initial conditions. However, it is exceptionally determined that timeout has occurred, and the process proceeds to step S906 to set the timer. In other words, in the process for the first GetMonitoringImage request in the process procedure, step S905 is skipped.

In step S907, it is determined whether or not the StoreFlag contained in the GetMonitoringImage request has a value of 0. If the StoreFlag has a value of 1, the initiator has requested not only a thumbnail image of the image k but also the image k itself (the original image of the thumbnail image).

If the StoreFlag is determined to have a value of 0, the image k is randomly selected from the images 1 to N (step S910). A thumbnail image of the selected image k is generated (step S911). In step S912, information on the image k is stored. Then, the condition flag is se to 1 (step S913).

On the other hand, if in step S907, the StoreFlag is determined not to have a value of 0, then it is determined whether or not the condition flag is 1 (step S909). In this case, if the condition flag is 1, the process proceeds to step S916. If the flag is not 1, the process then proceeds to step S910.

In step S914, it is determined again whether or not the StoreFlag contained in the GetMonitoringImage request has a value of 0. If the StoreFlag has a value of 0, the process proceeds to step S915. In step S915, a GetMonitoringImage response containing the thumbnail image of the image k is returned to the initiator. Then, the process returns to step S902. On the other hand, if in step S914, the StoreFlag contained in the GetMonitoringImage request is determined not to have a value of 0, the process proceeds to step S916.

In step S916, the GetMonitoringImage response containing the thumbnail image of the image k is returned to the initiator. The process then returns to step S902. If in step S916, the StoreFlag is 1, the response is returned together with the identifier (ImageHandle) for the image k. If in step S905, it is not detected that the timer has timed out, steps S906 to S913, described above, are skipped. Then, the thumbnail image of the image k internally stored and retained for a specified time is used as it is. The GetMonitoringImage response containing the thumbnail image or the GetMonitoringImage response containing the thumbnail image of the image k and the identifier (ImageHandle) for the image k is returned depending on the value of the StoreFlag.

In the present embodiment, the image selection unit 400 randomly selects one of the images 1 to N retained in the image storage unit 100. However, the images may be sequentially selected in the order of, for example, the image 1, the image 2, According to the fifth embodiment, described above, the initiator apparatus 9 can acquire a thumbnail image and its original image properly associated with each other, as in the case with the fourth embodiment, described above. Moreover, the processing load for image selection can be reduced. Furthermore, if the initiator apparatus 9 continuously issues GetMonitoringImage requests, the apparatus 1 according to the present embodiment responds with the same image for a specified time until the timer times out. Therefore, the user can check the same image for the specified time. This is preferable in implementing an image browsing process.

SIXTH EMBODIMENT

A sixth embodiment of the present invention will be described below. The sixth embodiment of the present invention relates to a specific example in which services are realized using an apparatus comprising the functions of the present invention. Description will be given of the exchange of image data between an apparatus 1000 and an apparatus 9000. The apparatus 1000 has functions described in the first to fifth embodiments and the apparatus 9000 has a function of acquiring image data from the apparatus 1000 and displaying it.

Figure 12:
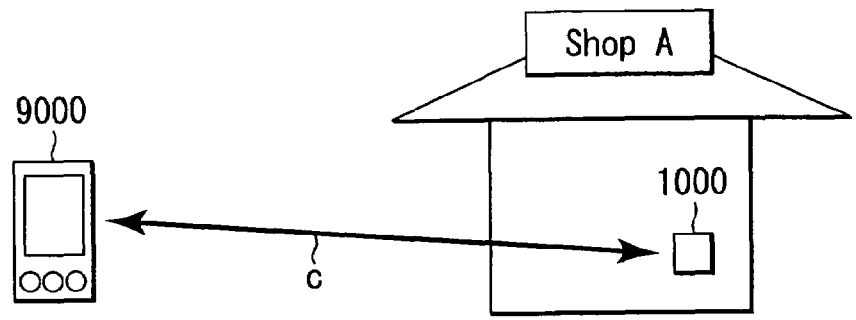
FIG. 12 is an illustration showing a sixth embodiment of the present invention.

As shown in FIG. 12, the apparatus 9000 and the apparatus 1000 are connected together via a wireless link including a Bluetooth communication path c. The apparatus 1000 is assumed to provide services and to be placed in a shop A. On the other hand, the apparatus 9000 is assumed to be portable, which acquires services and can be carried by a user with him or her.

Figure 13:
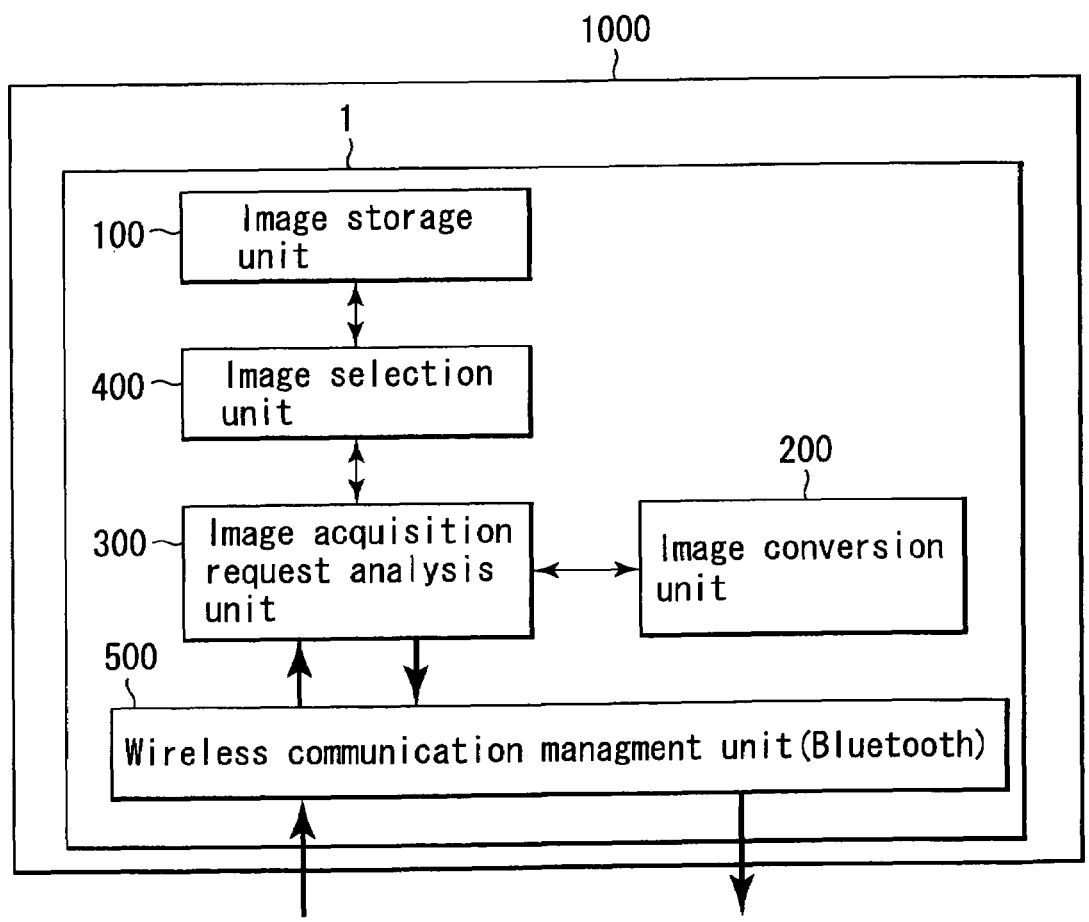
FIG. 13 is a diagram schematically showing a wireless communication apparatus according to the sixth embodiment.

FIG. 13 schematically shows the configuration of the apparatus 1000. The apparatus 1000 comprises the functions of the apparatus 1, shown in the first embodiment, as well as one of the image providing methods described above in the first to fifth embodiments. Thus, the apparatus 1000 can utilize the Bluetooth to transmit and receive data. Specifically, a communication protocol layer is implemented in the apparatus 1000 and contains communication protocols including the Bluetooth OBEX. The apparatus 1000 supports the BIP. The apparatus 1000 further comprises a remote camera feature specified in the BIP and operates as a responder.

The apparatus 1000 specifically includes hardware such as a personal computer incorporating the Bluetooth, a PDA (Personal Digital Assistant) incorporating the Bluetooth, a personal computer into which a Bluetooth card is inserted, a PDA into which a Bluetooth card is inserted, or a hard disk incorporating the Bluetooth. It is also assumed that software is installed in the apparatus 1000 to implement a Bluetooth protocol layer and the image providing method according to the present invention.

Figure 14:
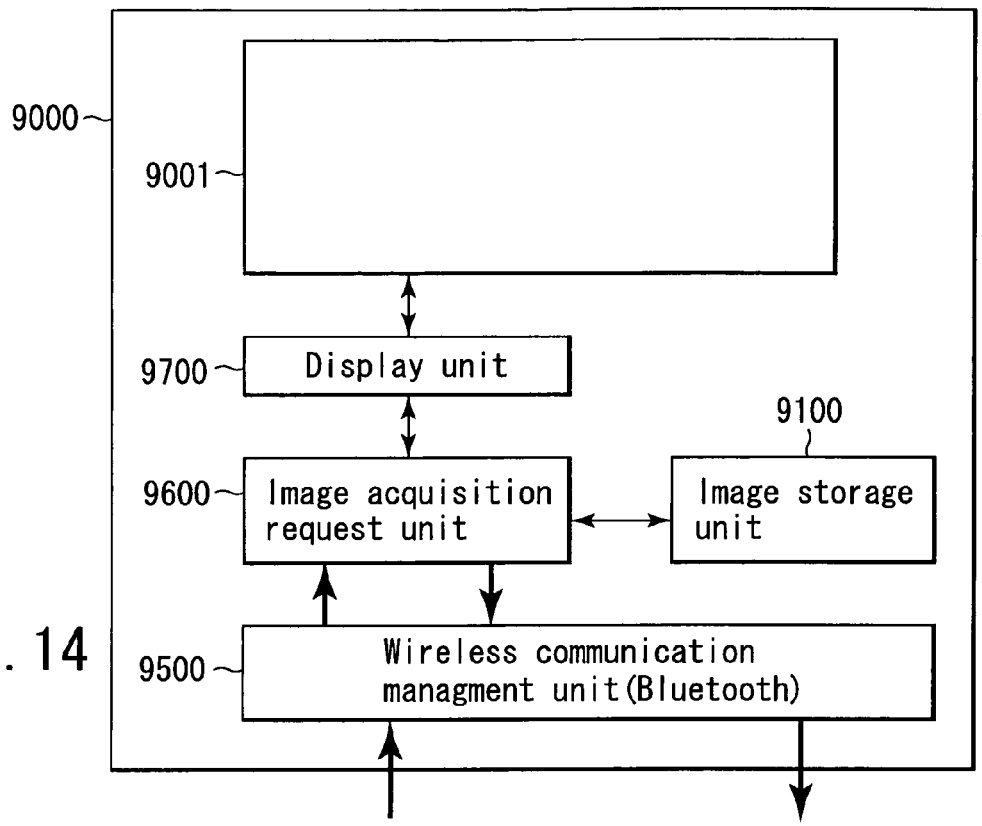
FIG. 14 is a diagram schematically showing another wireless communication apparatus according to the sixth embodiment.
Figure 15:
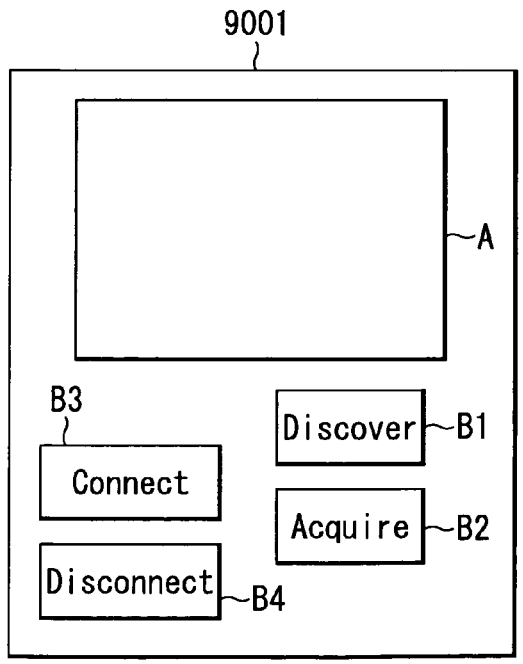
FIG. 15 is an illustration of an operation screen displayed by the display device of the wireless communication apparatus shown in FIG. 14.

FIG. 14 shows the configuration of the apparatus 9000. The apparatus 9000 comprises a wireless communication management unit 9500, an image acquisition request unit 9600, a storage unit 9100, and a display unit 9700. A communication protocol layer that includes the Bluetooth OBEX is implemented in the apparatus 9000. The apparatus 9000 supports the BIP over the Bluetooth OBEX. The apparatus 9000 further comprises the remote camera feature specified in the BIP and operates as an initiator. The apparatus 9000 specifically includes hardware that can be carried by the user with him or her, such as a PDA (Personal Digital Assistant) incorporating the Bluetooth and comprising a display area such as a liquid crystal screen, a PDA into which a Bluetooth card is inserted, or a cellular phone incorporating the Bluetooth. It is also assumed that software is installed in the apparatus 1000 to implement a Bluetooth protocol layer and the image acquiring method. The display unit 9700 controls a display device 9001 which corresponds to those provided in a PDA, cellular phone, or the like. FIG. 15 shows an example of an operation screen displayed on the display device 9001.

Figure 16:
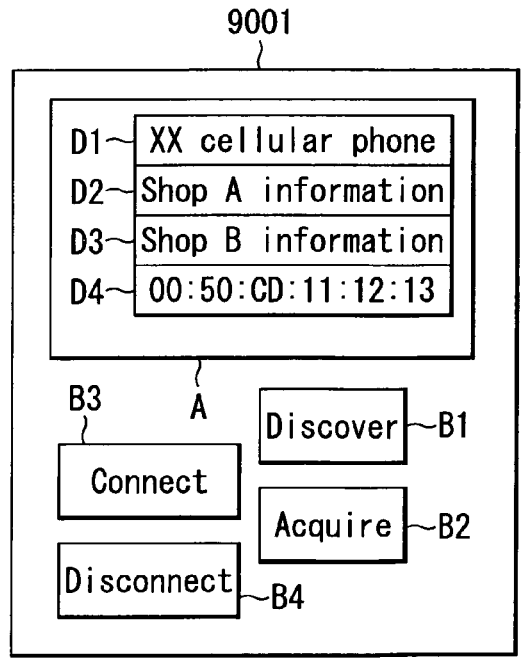
FIG. 16 shows a display example of the operation screen shown in FIG. 15, in the case where detected peripheral apparatuses are displayed on the screen.

In the example of the operation screen provided by the display unit 9700 as shown in FIG. 15, when the user operates a discovery button B1 (for example, with a PDA, a button displayed on the screen is tapped, or with a cellular phone, a hardware button is associated with the button on the displays unit), the display unit 9700 outputs a discovery request to the image acquisition request unit 9600. Upon receiving the inputted discovery request, the image acquisition request unit 9600 outputs a peripheral-apparatus discovery request to the wireless communication management unit 9500. Upon receiving the inputted peripheral-apparatus discovery request, the wireless communication management unit 9500 executes a process of discovering Bluetooth peripheral apparatuses and a process of retrieving services provided by the peripheral apparatuses. The wireless communication management unit 9500 thus detects the peripheral Bluetooth apparatuses as candidates for apparatuses operating as a responder for the BIP remote camera feature. The wireless communication management unit 9500 outputs information on the detected apparatuses to the image acquisition request unit 9100. Upon receiving the inputted apparatus information, the image acquisition request unit 9600 stores it in the storage unit 9100. The stored apparatus information includes device addresses and parameter information required to connect to a responder service for the remote camera feature. The image acquisition request unit 9600 causes the detected apparatus names to be displayed in a display area A through the display unit 9700 to inform the user of the name of the peripherally present apparatuses as candidates for a connection destination. FIG. 16 shows that the detected peripheral apparatuses D1 to D4 are displayed in the display area A. If in the apparatus 1000, the friendly name of the Bluetooth is set as "shop A information", the "shop A information" shown in FIG. 16 corresponds to the apparatus 1000.

In the example of the operation screen provided by the display unit 9700 as shown in FIG. 15, when the user selects the apparatus 1000 and operates a connection button B3, the display unit 9700 outputs a connection request to the image acquisition request unit 9600. Upon receiving the inputted connection request, the image acquisition request unit 9600 utilizes the wireless communication management unit 9500 to set a connection between the apparatus 1000 and the OBEX using a connection parameter stored in the storage unit 9100. Once the OBEX connection is set, the image acquisition request unit 9600 issues a GetMonitoringImage request with a store fag set to 0,to acquire a monitoring image from the apparatus 1000. Upon acquiring the monitoring image, the image acquisition request unit 9600 causes the monitoring image acquired to be displayed in the display area A via the display unit 9700. The image acquisition request unit 9600 repeatedly issues a GetMonitoringImage request with the store flag set to 0 and causes the monitoring image acquired to be displayed in the display area A via the display unit 9700.

In the example of the operation screen provided by the display unit 9700 as shown in FIG. 15, when a process is started to acquire a monitoring image, an acquisition button B2 is enabled. When the user operates the acquisition button B2, the image acquisition request unit 9600 issues a GetMonitoringImage request with the store flag set to 1,to acquire ImageHandle, an identifier for an image, from the apparatus 1000. Upon acquiring the ImageHandle, the image acquisition request unit 9600 issues a GetImage request containing the ImageHandle acquired, to acquire an image corresponding to the ImageHandle, from the apparatus 1000. Upon acquiring the corresponding image, the image acquisition request unit 9600 stores the image acquired in the storage unit 9100.

In the example of the operation screen provided by the display unit 9700 as shown in FIG. 15, once the OBEX connection is set, a disconnection button B4 is activated. When the user operates the disconnection button B4, the image acquisition request unit 9600 utilizes the wireless communication management unit 9500 to disconnect from the currently connected apparatus.

For the apparatus 9000, the following have been shown: the method of setting an OBEX connection, the method of deactivating the OBEX connection, the method of acquiring a monitoring image, the method of acquiring an identifier for an image, and the method of acquiring the corresponding image on the basis of the identifier for the image. These methods conform to the Bluetooth BIP.

The apparatus 1000 is assumed to provide services and to be placed in the ship A. It is further assumed that the image storage unit 100 stores a plurality of images as advertisement information on the shop A. If the apparatus 9000 is connected to the apparatus 1000 utilizing the BIP remote camera feature, the apparatus 1000 provides the apparatus 1000 with images stored in the storage unit 100, using the method described in the first, second, third, fourth, or fifth embodiment. In response to a GetMonitoringImage request with the store flag set to 0, i.e. a request for the acquisition of a monitoring image which request is sent by the apparatus 9000, the apparatus 1000 selects one of the saved images and provides the apparatus 9000 with a thumbnail of the selected image. On the other hand, in response to a GetMonitoringImage and GetImage requests with the store flag set to 1, the apparatus 1000 can provide a requested image of its original size. In this case, the apparatus 1000 can utilize the functions of the present invention to provide monitoring images at a rate of an appropriate time per an image. For example, this embodiment of the present invention can avoid the following situation: if the apparatus 9000 outputs several requests for the acquisition of a monitoring image within one second, the apparatus 1000 provides the apparatus 9000 with several different images within one second, so that the user of the apparatus 9000 cannot check the contents of the monitoring images. Moreover, while the user of the apparatus 9000 is checking shop advertisement information as monitoring images, if the user determines that the information is useful and requests the original image data to be acquired, the apparatus 1000 can correctly provide the images requested by the user of the apparatus 9000. This avoids the following situation: images unexpected by the user are provided at some points in time.

Therefore, the sixth embodiment of the present invention enables the construction of an advertisement information providing server that can easily provide advertisement information to apparatuses comprising a function of initiating the BIP remote camera feature.

SEVENTH EMBODIMENT

A seventh embodiment of the present invention will be described below. If the Bluetooth is utilized, then according to the Bluetooth specifications, an apparatus called a "master" can be connected to an apparatus called a "slave" and one master can be connected to seven slaves to generate a piconet. The relationship between the master and the slave is a link connection that is a lower stack according to the Bluetooth and is independent of an OBEX connection that is an upper stack according to the Bluetooth.

In the sixth embodiment, it is assumed that when the apparatus 9000 creates an OBEX connection to the apparatus 1000, the apparatus 9000 acts as a master, while the apparatus 1000 acts as a slave, according to the Bluetooth. However, in the present embodiment, the following method will be specifically described. The apparatus 1000 acts as a master, while the apparatus 9000 acts as a slave. A link connection that is a lower stack according to the Bluetooth is established. Then, the apparatus 9000 sets an OBEX connection to the apparatus 1000, the OBEX connection being an upper stack according to the Bluetooth. The apparatus 9000 then performs operations such as the acquisition of a monitoring image.

In the example of the operation screen provided by the display unit 9700 as shown in FIG. 15, when the user operates the discovery button B1 to display information on peripheral apparatus, selects the apparatus 1000, and then operates the connection button B3, the display unit 9700 outputs a connection request to the image acquisition request unit 9600. Upon receiving the inputted connection request, the image acquisition request unit 9600 registers a "connection service" for the apparatus 1000 in the wireless communication management unit 9500. The "connection service" is assumed to be a service record containing service information utilized in the Service Discovery Protocol (SDP), included in the Bluetooth protocol stack. The registration of the "connection service" for the apparatus 1000 means that at least a service record containing the information "apparatus 1000" is newly registered in an SDP processing unit. Once the "connection service" for the apparatus 1000 is registered, the wireless communication management unit 9500 is brought into a standby state.

On the other hand, the apparatus 1000 is assumed to have a function of periodically acquiring service information from peripherally present apparatuses in accordance with the SDP. The apparatus 1000 acquires service information from the apparatus 9000. If the information acquired indicates a connection to the apparatus 1000, the apparatus 1000 acts as a master to make a connection to the apparatus 9000. When the apparatus 1000 is connected to the apparatus 9000, the wireless communication management unit 9500 of the apparatus 9000 recovers from the standby state. The wireless communication management unit 9500 then acts as slave to notify the image acquisition request unit 9600 of this connected state. When notified of the connected state, the image acquisition request unit 9600 inputs an OBEX connection request to the wireless communication management unit 9500. The image acquisition request unit 9600 subsequently performs operations such as the acquisition of a monitoring image as in the case with the sixth embodiment. In this case, communication is continued with the apparatus 1000 acting as a master and the apparatus 9000 acting as a slave.

If in the standby state, a specified time or more has passed, the wireless communication management unit 9500 determines that the attempt to establish a connection has failed. When notified of the failure, the image acquisition request unit 9600 displays an indication of the failure in the display area of the display unit 9700.

The difference between the sixth embodiment and the seventh embodiment is that the apparatus 1000 acts as a slave or a master. When the apparatus 1000 acts as a master, it can be connected to plural slave apparatuses. Thus, if the apparatus 1000 is an advertisement information providing server that can provide advertisement information, it is possible to form a piconet and simultaneously provide advertisement information to the plural slave apparatuses. When the apparatus 1000 simultaneously provides advertisement information to plural apparatuses, the image providing method according to the present invention can be utilized to provide appropriate images as shown in the sixth embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus, comprising:
 a storage to store a plurality of images;
 a reception unit configured to receive plural separate image acquisition requests per second transmitted from another wireless communication apparatus in accordance with a camera control protocol for exchanging information relating to images;
 a selection unit configured to select, in response to the image acquisition request, one of the plurality of images stored in the storage and to output information relating to the one of the plurality of images; and a transmission unit configured to transmit at least one response to the another wireless communication apparatus in accordance with the camera control protocol, where the information outputted from the selection unit is contained in the response, wherein when the reception unit has received a first image acquisition request and a second image acquisition request in a predetermined time which is shorter than at least one second after receiving the first image acquisition request, the selection unit selects an identical image that is identical to an image selected responding to the first image acquisition request, the identical image being selected responding to the second image acquisition request, and outputs information relating to the identical image, and the transmission unit transmits a response containing the information relating to the identical image, in response to the second image acquisition request.

2. The apparatus according to claim 1, wherein the selection unit selects the one of the plurality of images randomly.

3. The apparatus according to claim 1, wherein the information relating to the one of the plurality of images that is selected by the selection unit comprises one of information on image contents, information on processed image contents and information on image attributes.

4. The apparatus according to claim 1, wherein the transmission unit transmits a set of responses to the another wireless communication apparatus in response to a series of continuous image acquisition requests from the another wireless communication apparatus, the set of responses containing identical information relating to the one of the plurality of images that is selected by the selection unit.

5. The apparatus according to claim 4, further comprising:
a timer which starts when a first one of the series of continuous image acquisition requests is received, and
wherein the transmission unit continues to transmit the set of responses unless the timer times out.

6. The apparatus according to claim 4, further comprising a measurement unit configured to compare a first time with a second time to measure a time difference, the first time being a time at which the reception unit has received a first image acquisition request, and the second time being a time at which the reception unit has received a second image acquisition request following the first image acquisition request, and
wherein the selection unit is configured to select another image, when the time difference is not more than a threshold.

7. The apparatus according to claim 1, further comprising:
a first determination unit configured to determine whether or not the one of the plurality of image acquisition requests identification information on an image; and
a second determination unit configured to determine whether or not the image has already been selected by the selection unit, and
wherein if the second determination unit determines that the image has already been selected by the selection unit, the transmission unit transmits the corresponding identification information on the image instead of currently selecting another image and transmitting a current identification information on the image.

8. The apparatus according to claim 7, further comprising:
a timer which starts when the image acquisition request, requesting the identification information on the image, is received, and wherein the transmission unit continues to transmit the corresponding identification information on the image unless the timer times out.

9. A wireless communication method, comprising:

storing a plurality of images in a storage of a wireless communication apparatus;

receiving plural separate image acquisition requests per second transmitted from another wireless communication apparatus in accordance with a camera control protocol for exchanging information relating to images;

selecting, in response to the image acquisition requests, one of the plurality of images stored in the storage and outputting information relating to the one of the plurality of images; and transmitting at least one response to the another wireless communication apparatus in accordance with the camera control protocol, where the information relating to the one of the plurality of images is contained in the response, wherein when a first image acquisition request has been received and a second image acquisition request has been received in a predetermined time which is shorter than at least one second after receiving the first image acquisition request, an identical image that is identical to an image selected responding to the first image acquisition request is selected, the identical image being selected responding to the second image acquisition request, and information relating to the identical image is outputted, and a response containing the information relating to the identical image is transmitted in response to the second image acquisition request.

10. The method according to claim 9, wherein the one of the plurality of images is selected randomly from the plurality of images.

11. The method according to claim 9, wherein the information relating to the one of the plurality of images comprises one of information on image contents, information on processed image contents, and information on image attributes.

12. The method according to claim 9, wherein the transmitting includes transmitting a set of responses that contain identical information relating to the one of the plurality of images to the another wireless communication apparatus, in response to a series of continuous image acquisition requests from the another wireless communication apparatus.

13. The method according to claim 12, further comprising:
starting a timer when a first one of the series of continuous image acquisition requests is received, and
continuing to transmit the set of responses unless the timer times out.

14. The method according to claim 12, further comprising comparing a time at which a first image acquisition request has been received with a time at which a second image acquisition request has been received following the first image acquisition request in order to measure a time difference, and
wherein the selecting the one of the plurality of images includes selecting another image, when the time difference is not more than a threshold.

15. The method according to claim 9, further comprising:
determining whether or not one of the image acquisition requests identification information on an image; and
determining whether or not the image has already been selected, and
wherein if the image has already been selected, then:
transmitting the corresponding identification information on the image instead of currently selecting another image and transmitting a current identification information on the image.

16. The method according to claim 15, further comprising:
starting a timer when one of the image acquisition requests, requesting the identification information on the image, is received, and
continuing to transmit the corresponding identification information on the image unless the timer times out.

* * * * *